United States Patent
Leser et al.

(10) Patent No.: US 9,993,098 B2
(45) Date of Patent: Jun. 12, 2018

(54) INSULATED CONTAINER WITH MOLDED BRIM

(75) Inventors: Chris K Leser, Evansville, IN (US);
Charles T Wallace, Evansville, IN (US); Philip A Driskill, Newburgh, IN (US); John B Euler, Evansville, IN (US); Jason J Paladino, Newburgh, IN (US); Milan C Maravich, Newburgh, IN (US); Daniel O Davis, Cynthiana, IN (US); Jeffrey A Mann, Evansville, IN (US); Randy A Bowlds, Evansville, IN (US)

(73) Assignee: Berry Plastics Corporation, Evansville, IN (US)

( * ) Notice: Subject to any disclaimer, the term of this patent is extended or adjusted under 35 U.S.C. 154(b) by 899 days.

(21) Appl. No.: 13/525,640

(22) Filed: Jun. 18, 2012

(65) Prior Publication Data
US 2012/0318806 A1    Dec. 20, 2012

Related U.S. Application Data

(60) Provisional application No. 61/498,435, filed on Jun. 17, 2011, provisional application No. 61/618,632, filed on Mar. 30, 2012.

(51) Int. Cl.
*A47G 19/22*    (2006.01)
*B29C 65/06*    (2006.01)
(Continued)

(52) U.S. Cl.
CPC ..... *A47G 19/2288* (2013.01); *B65D 43/0212* (2013.01); *B65D 81/3874* (2013.01); *B29C 43/02* (2013.01); *B29C 65/02* (2013.01); *B29C 65/06* (2013.01); *B29C 65/0672* (2013.01); *B29C 65/48* (2013.01); *B29C 66/5344* (2013.01); *B29C 66/71* (2013.01);
(Continued)

(58) Field of Classification Search
CPC . B65D 3/06; B65D 3/28; B65D 15/04; B65D 15/00; B65D 15/08; B65D 15/16; B65D 15/20
USPC .. 220/592.17, 592.26, 292.2, 641, 640, 643; 229/400, 403; 206/819
See application file for complete search history.

(56) References Cited

U.S. PATENT DOCUMENTS 1,396,282 A    11/1921    Penn
1,435,120 A    11/1922    Holman
(Continued)

FOREIGN PATENT DOCUMENTS

CA    2291607    6/2000
CA    2765489    12/2010
(Continued)

OTHER PUBLICATIONS

Jaakko I. Raukola, A New Technology to Manufacture Polypropylene Foam Sheet and Biaxially Oriented Foam Film, VTT Publications 361, Technical Research Centre of Finland, Apr. 1998, 100 pages.
(Continued)

*Primary Examiner* — Andrew Perreault
(74) *Attorney, Agent, or Firm* — Barnes & Thornburg, LLP

(57) ABSTRACT

A container is formed to include an interior region and a mouth opening into the interior region. The container includes a floor and a side wall coupled to the floor to define the interior region between the floor and the side wall.

17 Claims, 11 Drawing Sheets

(51) Int. Cl.
*B23P 11/00* (2006.01)
*B29C 65/48* (2006.01)
*B65D 6/02* (2006.01)
*B65D 81/38* (2006.01)
*B65D 43/02* (2006.01)
*B29L 31/00* (2006.01)
*B29C 65/00* (2006.01)
*B29C 43/02* (2006.01)
*B29C 65/02* (2006.01)

(52) U.S. Cl.
CPC .......... *B29C 66/723* (2013.01); *B29C 66/727* (2013.01); *B29L 2031/7132* (2013.01); *B65D 2543/00046* (2013.01); *B65D 2543/00092* (2013.01); *B65D 2543/00296* (2013.01); *B65D 2543/00351* (2013.01); *B65D 2543/00509* (2013.01); *B65D 2543/00537* (2013.01); *B65D 2543/00555* (2013.01); *B65D 2543/00629* (2013.01); *B65D 2543/00685* (2013.01); *B65D 2543/00731* (2013.01); *B65D 2543/00796* (2013.01); *Y10T 29/49826* (2015.01)

(56) References Cited

U.S. PATENT DOCUMENTS

| | | |
|---|---|---|
| 1,920,529 A | 8/1933 | Sidebotham |
| 1,969,030 A | 8/1934 | Page |
| 2,097,899 A | 11/1937 | Smith |
| 2,774,509 A * | 12/1956 | Knobloch ............ 220/655 |
| 2,809,776 A | 10/1957 | Barrington |
| 3,312,383 A | 4/1967 | Shapiro et al. |
| 3,327,038 A | 6/1967 | Fox |
| 3,344,222 A | 9/1967 | Shapiro et al. |
| 3,468,467 A | 9/1969 | Amberg |
| 3,547,012 A | 12/1970 | Amberg et al. |
| 3,583,624 A | 6/1971 | Peacock |
| 3,733,381 A | 5/1973 | Willette et al. |
| 3,793,283 A | 2/1974 | Frailey et al. |
| 3,846,349 A | 11/1974 | Harada et al. |
| 3,967,991 A | 7/1976 | Shimano et al. |
| 3,971,696 A | 7/1976 | Manfredi |
| 4,049,122 A | 9/1977 | Maxwell |
| 4,070,513 A | 1/1978 | Rhoads |
| 4,094,460 A * | 6/1978 | Scanga et al. ............ 229/123.1 |
| 4,106,397 A | 8/1978 | Amberg |
| 4,171,085 A | 10/1979 | Doty |
| 4,197,948 A | 4/1980 | Amberg et al. |
| 4,240,568 A | 12/1980 | Pool |
| 4,284,226 A | 8/1981 | Herbst |
| 4,298,331 A | 11/1981 | Mueller |
| 4,299,349 A | 11/1981 | Gilden |
| 4,300,891 A | 11/1981 | Bemiss |
| 4,349,400 A | 9/1982 | Gilden |
| 4,365,460 A | 12/1982 | Cress |
| 4,409,045 A | 10/1983 | Busse |
| 4,550,046 A | 10/1985 | Miller |
| 4,621,763 A | 11/1986 | Brauner |
| 4,664,285 A * | 5/1987 | Korcz et al. ............ 220/613 |
| 4,706,873 A | 11/1987 | Schulz |
| 4,720,023 A | 1/1988 | Jeff |
| 4,878,970 A | 11/1989 | Schubert et al. |
| 4,918,112 A | 4/1990 | Roox |
| 4,940,736 A | 7/1990 | Alteepping |
| 5,078,817 A | 1/1992 | Takagaki |
| 5,158,986 A | 10/1992 | Cha et al. |
| 5,160,674 A | 11/1992 | Colton et al. |
| 5,180,751 A | 1/1993 | Park |
| 5,286,428 A | 2/1994 | Hayashi et al. |
| 5,308,568 A | 5/1994 | Lipp |
| 5,348,795 A | 9/1994 | Park |
| 5,366,791 A | 11/1994 | Carr et al. |
| 5,385,260 A | 1/1995 | Gatcomb |
| 5,443,769 A | 8/1995 | Karabedian |
| 5,445,315 A | 8/1995 | Shelby |
| 5,490,631 A | 2/1996 | Iioka et al. |
| 5,547,124 A | 8/1996 | Mueller |
| 5,605,936 A | 2/1997 | DeNicola, Jr. |
| 5,622,308 A | 4/1997 | Ito et al. |
| 5,628,453 A | 5/1997 | MacLaughlin |
| 5,629,076 A | 5/1997 | Fukasawa et al. |
| 5,759,624 A | 6/1998 | Neale et al. |
| 5,765,710 A | 6/1998 | Bergerioux |
| 5,766,709 A | 6/1998 | Geddes |
| 5,769,311 A | 6/1998 | Morita |
| 5,819,507 A | 10/1998 | Kaneko et al. |
| 5,840,139 A | 11/1998 | Geddes et al. |
| 5,866,053 A | 2/1999 | Park et al. |
| 5,868,309 A | 2/1999 | Sandstrom |
| 5,944,225 A | 8/1999 | Kawolics |
| 5,948,839 A | 9/1999 | Chatterjee |
| 6,007,437 A | 12/1999 | Schickert et al. |
| 6,030,476 A | 2/2000 | Geddes et al. |
| 6,034,144 A | 3/2000 | Shioya |
| 6,051,174 A | 4/2000 | Park et al. |
| 6,071,580 A | 6/2000 | Bland et al. |
| 6,103,153 A | 8/2000 | Park |
| 6,129,653 A | 10/2000 | Fredricks et al. |
| 6,136,396 A | 10/2000 | Gilmer |
| 6,139,665 A | 10/2000 | Schmelzer et al. |
| 6,142,331 A | 11/2000 | Breining et al. |
| 6,169,122 B1 | 1/2001 | Blizard et al. |
| 6,231,942 B1 | 5/2001 | Blizard et al. |
| 6,235,380 B1 | 5/2001 | Tupil et al. |
| 6,267,837 B1 | 7/2001 | Mitchell et al. |
| 6,284,810 B1 | 9/2001 | Burnham et al. |
| 6,294,115 B1 | 9/2001 | Blizard et al. |
| 6,306,973 B1 | 10/2001 | Takaoka et al. |
| 6,308,883 B1 | 10/2001 | Schmelzer et al. |
| 6,319,590 B1 | 11/2001 | Geddes et al. |
| 6,328,916 B1 | 12/2001 | Nishikawa |
| 6,376,059 B1 | 4/2002 | Anderson et al. |
| 6,379,802 B2 | 4/2002 | Ito et al. |
| 6,420,024 B1 | 7/2002 | Perez et al. |
| 6,444,073 B1 | 9/2002 | Reeves et al. |
| 6,468,451 B1 | 10/2002 | Perez |
| 6,472,473 B1 | 10/2002 | Ansems et al. |
| RE37,923 E | 12/2002 | Baldwin et al. |
| 6,512,019 B1 | 1/2003 | Agarwal et al. |
| 6,521,675 B1 | 2/2003 | Wu et al. |
| 6,541,105 B1 | 4/2003 | Park |
| 6,562,447 B2 | 5/2003 | Wu et al. |
| 6,565,934 B1 | 5/2003 | Fredricks et al. |
| 6,586,532 B1 | 7/2003 | Gauthy |
| 6,593,005 B2 | 7/2003 | Tau et al. |
| 6,593,384 B2 | 7/2003 | Anderson et al. |
| 6,613,811 B1 | 9/2003 | Pallaver et al. |
| 6,616,434 B1 | 9/2003 | Burnham et al. |
| 6,646,019 B2 | 11/2003 | Perez et al. |
| 6,649,666 B1 | 11/2003 | Read et al. |
| 6,713,139 B2 | 3/2004 | Usui |
| 6,720,362 B1 | 4/2004 | Park |
| 6,749,913 B2 | 6/2004 | Watanabe et al. |
| 6,779,662 B2 | 8/2004 | Dorsey |
| 6,811,843 B2 | 11/2004 | DeBraal et al. |
| 6,814,253 B2 | 11/2004 | Wong |
| 6,883,677 B2 | 4/2005 | Goeking et al. |
| 6,884,377 B1 | 4/2005 | Burnham et al. |
| 6,884,851 B2 | 4/2005 | Gauthy |
| 6,908,651 B2 | 6/2005 | Watanabe et al. |
| 6,926,507 B2 | 8/2005 | Cardona et al. |
| 6,926,512 B2 | 8/2005 | Wu et al. |
| 7,070,852 B1 | 7/2006 | Reiners |
| 7,074,466 B2 | 7/2006 | DeBraal |
| 7,094,463 B2 | 8/2006 | Haas et al. |
| 7,121,991 B2 | 10/2006 | Mannlein |
| 7,144,532 B2 | 12/2006 | Kim |
| 7,173,069 B2 | 2/2007 | Swennen |
| 7,234,629 B2 | 6/2007 | Herbert |
| 7,281,650 B1 | 10/2007 | Milan |
| 7,355,089 B2 | 4/2008 | Chang et al. |
| 7,361,720 B2 | 4/2008 | Pierini et al. |
| 7,365,136 B2 | 4/2008 | Huovinen |

(56) References Cited

U.S. PATENT DOCUMENTS

| | | |
|---|---|---|
| 7,423,071 B2 | 9/2008 | Mogami et al. |
| 7,458,504 B2 | 12/2008 | Robertson et al. |
| 7,504,347 B2 | 3/2009 | Poon et al. |
| 7,510,098 B2 | 3/2009 | Hartjes et al. |
| 7,513,386 B2 | 4/2009 | Hartjes et al. |
| 7,514,517 B2 | 4/2009 | Hoenig et al. |
| 7,524,911 B2 | 4/2009 | Karjala et al. |
| 7,557,147 B2 | 7/2009 | Martinez et al. |
| 7,579,408 B2 | 8/2009 | Walton et al. |
| 7,582,716 B2 | 9/2009 | Liang et al. |
| 7,585,557 B2 | 9/2009 | Aylward et al. |
| 7,592,397 B2 | 9/2009 | Markovich et al. |
| 7,608,668 B2 | 10/2009 | Shan et al. |
| 7,622,179 B2 | 11/2009 | Patel |
| 7,622,529 B2 | 11/2009 | Walton et al. |
| 7,622,881 B2 | 11/2009 | Golownia et al. |
| 7,629,416 B2 | 12/2009 | Li et al. |
| 7,655,296 B2 | 2/2010 | Haas et al. |
| 7,662,881 B2 | 2/2010 | Walton |
| 7,666,918 B2 | 2/2010 | Prieto et al. |
| 7,671,106 B2 | 3/2010 | Markovich et al. |
| 7,671,131 B2 | 3/2010 | Hughes et al. |
| 7,673,564 B2 | 3/2010 | Wolf et al. |
| 7,687,442 B2 | 3/2010 | Walton et al. |
| 7,695,812 B2 | 4/2010 | Peng et al. |
| 7,714,071 B2 | 5/2010 | Hoenig et al. |
| 7,732,052 B2 | 6/2010 | Chang et al. |
| 7,737,061 B2 | 6/2010 | Chang et al. |
| 7,737,215 B2 | 6/2010 | Chang et al. |
| 7,741,397 B2 | 6/2010 | Liang et al. |
| 7,754,814 B2 | 7/2010 | Barcus et al. |
| 7,759,404 B2 | 7/2010 | Burgun |
| 7,786,216 B2 | 8/2010 | Soediono et al. |
| 7,787,216 B2 | 8/2010 | Soediono |
| 7,795,321 B2 | 9/2010 | Cheung et al. |
| 7,803,728 B2 | 9/2010 | Poon et al. |
| 7,811,644 B2 | 10/2010 | DeBraal et al. |
| 7,818,866 B2 | 10/2010 | Hollis |
| 7,820,282 B2 | 10/2010 | Haas et al. |
| 7,841,974 B2 | 11/2010 | Hartjes et al. |
| 7,842,770 B2 | 11/2010 | Liang et al. |
| 7,858,706 B2 | 12/2010 | Arriola et al. |
| 7,863,379 B2 | 1/2011 | Kapur et al. |
| 7,883,769 B2 | 2/2011 | Seth et al. |
| 7,893,166 B2 | 2/2011 | Shan et al. |
| 7,897,689 B2 | 3/2011 | Harris et al. |
| 7,906,587 B2 | 3/2011 | Poon et al. |
| 7,906,588 B2 | 3/2011 | Poon |
| 7,910,658 B2 | 3/2011 | Chang et al. |
| 7,915,192 B2 | 3/2011 | Arriola et al. |
| 7,918,005 B2 | 4/2011 | Hollis et al. |
| 7,918,016 B2 | 4/2011 | Hollis et al. |
| 7,922,071 B2 | 4/2011 | Robertson |
| 7,922,971 B2 | 4/2011 | Robertson et al. |
| 7,928,162 B2 | 4/2011 | Kiss et al. |
| 7,928,176 B2 | 4/2011 | Kiss |
| 7,935,740 B2 | 5/2011 | Dang et al. |
| 7,947,367 B2 | 5/2011 | Poon et al. |
| 7,951,882 B2 | 5/2011 | Arriola et al. |
| 7,977,397 B2 | 7/2011 | Cheung et al. |
| 7,989,543 B2 | 8/2011 | Karjala et al. |
| 7,993,254 B2 | 8/2011 | Robertson et al. |
| 7,998,579 B2 | 8/2011 | Lin |
| 7,998,728 B2 | 8/2011 | Rhoads et al. |
| 8,003,176 B2 | 8/2011 | Ylitalo et al. |
| 8,003,744 B2 | 8/2011 | Okamoto et al. |
| 8,012,550 B2 | 9/2011 | Ylitalo et al. |
| 8,026,291 B2 | 9/2011 | Handa et al. |
| 8,043,695 B2 | 10/2011 | Ballard et al. |
| 8,067,319 B2 | 11/2011 | Poon et al. |
| 8,076,381 B2 | 12/2011 | Miyagawa et al. |
| 8,076,416 B2 | 12/2011 | Ellul |
| 8,084,537 B2 | 12/2011 | Walton et al. |
| 8,087,147 B2 | 1/2012 | Hollis et al. |
| 8,105,459 B2 | 1/2012 | Alvarez |
| 8,119,237 B2 | 2/2012 | Peng et al. |
| 8,124,234 B2 | 2/2012 | Weaver et al. |
| 8,173,233 B2 | 5/2012 | Rogers et al. |
| 8,198,374 B2 | 6/2012 | Arriola et al. |
| 8,211,982 B2 | 7/2012 | Harris et al. |
| 8,227,075 B2 | 7/2012 | Matsushita |
| 8,273,068 B2 | 9/2012 | Chang et al. |
| 8,273,826 B2 | 9/2012 | Walton et al. |
| 8,273,838 B2 | 9/2012 | Shan et al. |
| 8,288,470 B2 | 10/2012 | Ansems et al. |
| 8,304,496 B2 | 11/2012 | Weaver et al. |
| 8,404,780 B2 | 3/2013 | Weaver et al. |
| 8,435,615 B2 | 5/2013 | Tsuchida |
| 8,679,620 B2 | 3/2014 | Matsushita |
| 8,883,280 B2 | 11/2014 | Leser |
| 2001/0010849 A1 | 8/2001 | Blizard |
| 2002/0030296 A1 | 3/2002 | Geddes et al. |
| 2002/0058126 A1 | 5/2002 | Kannankeril |
| 2002/0137851 A1 | 9/2002 | Kim et al. |
| 2002/0144769 A1 | 10/2002 | Debraal et al. |
| 2002/0172818 A1 | 11/2002 | DeBraal et al. |
| 2003/0003251 A1 | 1/2003 | DeBraal et al. |
| 2003/0017284 A1 | 1/2003 | Watanabe et al. |
| 2003/0029876 A1 | 2/2003 | Giraud |
| 2003/0108695 A1 | 6/2003 | Freek et al. |
| 2003/0138515 A1 | 7/2003 | Harfmann |
| 2003/0211310 A1 | 11/2003 | Haas et al. |
| 2003/0228336 A1* | 12/2003 | Gervasio .................. 424/401 |
| 2003/0232210 A1 | 12/2003 | Haas et al. |
| 2004/0031714 A1 | 2/2004 | Hanson |
| 2004/0038018 A1 | 2/2004 | Anderson et al. |
| 2004/0115418 A1 | 6/2004 | Anderson et al. |
| 2004/0162358 A1 | 8/2004 | Yamamoto |
| 2004/0170814 A1 | 9/2004 | VanHandel |
| 2005/0003122 A1 | 1/2005 | Debraal et al. |
| 2005/0006449 A1 | 1/2005 | DAmato |
| 2005/0101926 A1 | 5/2005 | Ausen et al. |
| 2005/0104365 A1 | 5/2005 | Haas et al. |
| 2005/0121457 A1 | 6/2005 | Wilson |
| 2005/0147807 A1 | 7/2005 | Haas et al. |
| 2005/0159496 A1 | 7/2005 | Bambara et al. |
| 2005/0184136 A1 | 8/2005 | Baynum, III |
| 2005/0236294 A1 | 10/2005 | Herbert |
| 2005/0256215 A1 | 11/2005 | Burnham et al. |
| 2005/0272858 A1 | 12/2005 | Pierini et al. |
| 2005/0288383 A1 | 12/2005 | Haas et al. |
| 2006/0000882 A1 | 1/2006 | Darzinskas |
| 2006/0095151 A1 | 5/2006 | Mannlein |
| 2006/0135699 A1 | 6/2006 | Li et al. |
| 2006/0148920 A1 | 7/2006 | Musgrave et al. |
| 2006/0178478 A1 | 8/2006 | Ellul |
| 2006/0198983 A1 | 9/2006 | Patel |
| 2006/0199006 A1 | 9/2006 | Poon et al. |
| 2006/0199030 A1 | 9/2006 | Liang et al. |
| 2006/0199744 A1 | 9/2006 | Walton et al. |
| 2006/0199872 A1 | 9/2006 | Prieto et al. |
| 2006/0199884 A1 | 9/2006 | Hoenig et al. |
| 2006/0199887 A1 | 9/2006 | Liang et al. |
| 2006/0199896 A1 | 9/2006 | Walton et al. |
| 2006/0199897 A1 | 9/2006 | Karjala et al. |
| 2006/0199905 A1 | 9/2006 | Hughes et al. |
| 2006/0199906 A1 | 9/2006 | Walton et al. |
| 2006/0199907 A1 | 9/2006 | Chang et al. |
| 2006/0199908 A1 | 9/2006 | Cheung et al. |
| 2006/0199910 A1 | 9/2006 | Walton et al. |
| 2006/0199911 A1 | 9/2006 | Markovich et al. |
| 2006/0199912 A1 | 9/2006 | Fuchs et al. |
| 2006/0199914 A1 | 9/2006 | Harris et al. |
| 2006/0199930 A1 | 9/2006 | Shan et al. |
| 2006/0199931 A1 | 9/2006 | Poon et al. |
| 2006/0199933 A1 | 9/2006 | Okamoto et al. |
| 2006/0205833 A1 | 9/2006 | Martinez |
| 2006/0211819 A1 | 9/2006 | Hoenig et al. |
| 2006/0234033 A1 | 10/2006 | Nishikawa |
| 2006/0289609 A1 | 12/2006 | Fritz |
| 2006/0289610 A1 | 12/2006 | Kling |
| 2007/0010616 A1 | 1/2007 | Kapur et al. |
| 2007/0032600 A1 | 2/2007 | Mogami et al. |
| 2007/0056964 A1 | 3/2007 | Holcomb |

(56) References Cited

U.S. PATENT DOCUMENTS

| | | |
|---|---|---|
| 2007/0065615 A1 | 3/2007 | Odle |
| 2007/0066756 A1 | 3/2007 | Poon et al. |
| 2007/0078222 A1 | 4/2007 | Chang et al. |
| 2007/0095837 A1 | 5/2007 | Meier |
| 2007/0112127 A1 | 5/2007 | Soediono et al. |
| 2007/0141188 A1 | 6/2007 | Kim |
| 2007/0155900 A1 | 7/2007 | Chang et al. |
| 2007/0167315 A1 | 7/2007 | Arriola et al. |
| 2007/0167575 A1 | 7/2007 | Weaver et al. |
| 2007/0167578 A1 | 7/2007 | Arriola et al. |
| 2007/0202330 A1 | 8/2007 | Peng et al. |
| 2007/0219334 A1 | 9/2007 | Shan et al. |
| 2008/0118738 A1* | 5/2008 | Boyer et al. ............... 428/315.9 |
| 2008/0121681 A1 | 5/2008 | Wiedmeyer |
| 2008/0156857 A1 | 7/2008 | Johnston |
| 2008/0177242 A1 | 7/2008 | Chang et al. |
| 2008/0227877 A1 | 9/2008 | Stadlbauer et al. |
| 2008/0234435 A1 | 9/2008 | Chang et al. |
| 2008/0260996 A1 | 10/2008 | Heilman |
| 2008/0269388 A1 | 10/2008 | Markovich et al. |
| 2008/0280517 A1 | 11/2008 | Chang et al. |
| 2008/0281037 A1 | 11/2008 | Karjala et al. |
| 2008/0311812 A1 | 12/2008 | Arriola et al. |
| 2009/0042472 A1 | 2/2009 | Poon et al. |
| 2009/0068402 A1 | 3/2009 | Yoshida et al. |
| 2009/0069523 A1 | 3/2009 | Itakura |
| 2009/0076216 A1 | 3/2009 | Kiss et al. |
| 2009/0105417 A1 | 4/2009 | Walton et al. |
| 2009/0110944 A1 | 4/2009 | Aguirre |
| 2009/0170679 A1 | 7/2009 | Hartjes et al. |
| 2009/0220711 A1 | 9/2009 | Chang |
| 2009/0247033 A1 | 10/2009 | Peng et al. |
| 2009/0263645 A1 | 10/2009 | Barger |
| 2009/0027569 A1 | 11/2009 | Weaver |
| 2009/0275690 A1 | 11/2009 | Weaver et al. |
| 2009/0324914 A1 | 12/2009 | Liang et al. |
| 2010/0025073 A1 | 2/2010 | Fagrell |
| 2010/0028568 A1 | 2/2010 | Weaver et al. |
| 2010/0029827 A1 | 2/2010 | Ansems et al. |
| 2010/0040818 A1 | 2/2010 | Farha |
| 2010/0055358 A1 | 3/2010 | Weaver et al. |
| 2010/0069574 A1 | 3/2010 | Shan et al. |
| 2010/0093942 A1 | 4/2010 | Silvis et al. |
| 2010/0137118 A1 | 6/2010 | Chang |
| 2010/0147447 A1* | 6/2010 | Mazzarolo ............... 156/196 |
| 2010/0168267 A1 | 7/2010 | Dang et al. |
| 2010/0181328 A1 | 7/2010 | Cook |
| 2010/0181370 A1 | 7/2010 | Berbert |
| 2010/0196610 A1 | 8/2010 | Chang et al. |
| 2010/0240818 A1 | 9/2010 | Walton et al. |
| 2010/0279571 A1 | 11/2010 | Poon et al. |
| 2010/0324202 A1 | 12/2010 | Bafna et al. |
| 2011/0003929 A1 | 1/2011 | Soediono et al. |
| 2011/0008570 A1 | 1/2011 | Seth et al. |
| 2011/0009513 A1 | 1/2011 | Chaudhary et al. |
| 2011/0091688 A1 | 4/2011 | Maurer et al. |
| 2011/0104414 A1 | 5/2011 | Onodera et al. |
| 2011/0111150 A1 | 5/2011 | Matsuzaki et al. |
| 2011/0118370 A1 | 5/2011 | Jiang et al. |
| 2011/0118416 A1 | 5/2011 | Arriola et al. |
| 2011/0124818 A1 | 5/2011 | Arriola et al. |
| 2011/0136959 A1 | 6/2011 | Brandstetter |
| 2011/0144240 A1 | 6/2011 | Harris et al. |
| 2011/0217492 A1 | 9/2011 | Stamatiou et al. |
| 2011/0229693 A1 | 9/2011 | Maurer |
| 2011/0230108 A1 | 9/2011 | Arriola et al. |
| 2011/0318560 A1 | 12/2011 | Yun et al. |
| 2012/0004087 A1 | 1/2012 | Tharayil |
| 2012/0024873 A1 | 2/2012 | Rosenblade et al. |
| 2012/0028065 A1 | 2/2012 | Bafna et al. |
| 2012/0041148 A1 | 2/2012 | Bafna et al. |
| 2012/0043374 A1 | 2/2012 | Lemon |
| 2012/0045603 A1 | 2/2012 | Zerafati |
| 2012/0108714 A1 | 5/2012 | Wittner |
| 2012/0108743 A1 | 5/2012 | Krishnaswamy |
| 2012/0125926 A1 | 5/2012 | Iyori et al. |
| 2012/0132699 A1 | 5/2012 | Mann |
| 2012/0178896 A1 | 7/2012 | Bastioli et al. |
| 2012/0184657 A1 | 7/2012 | Lake, Jr. et al. |
| 2012/0193365 A1 | 8/2012 | Humphries |
| 2012/0199278 A1 | 8/2012 | Lee |
| 2012/0199641 A1 | 8/2012 | Hsieh |
| 2012/0214890 A1 | 8/2012 | Senda |
| 2012/0220730 A1 | 8/2012 | Li |
| 2012/0225961 A1 | 9/2012 | VanHorn |
| 2012/0237734 A1 | 9/2012 | Maurer |
| 2012/0241462 A1* | 9/2012 | Lin ............................. 220/738 |
| 2012/0267368 A1 | 10/2012 | Wu et al. |
| 2012/0270039 A1 | 10/2012 | Tynys |
| 2012/0295994 A1 | 11/2012 | Bernreitner |
| 2012/0318805 A1 | 12/2012 | Leser |
| 2012/0318807 A1 | 12/2012 | Leser |
| 2013/0023598 A1 | 1/2013 | Song |
| 2013/0032963 A1 | 2/2013 | Tokiwa |
| 2013/0052385 A1 | 2/2013 | Leser |
| 2013/0280517 A1 | 10/2013 | Buehring |
| 2013/0303645 A1 | 11/2013 | Dix |

FOREIGN PATENT DOCUMENTS

| | | |
|---|---|---|
| CN | 1288427 | 3/2001 |
| CN | 1523051 | 8/2004 |
| CN | 101044195 | 9/2007 |
| CN | 101104716 | 1/2008 |
| CN | 101352923 | 1/2009 |
| CN | 101429309 | 5/2009 |
| CN | 101560307 | 10/2009 |
| CN | 201347706 Y | 11/2009 |
| CN | 102030960 | 4/2011 |
| DE | 2831240 | 3/1988 |
| DE | 102006025612 | 11/2007 |
| DE | 102008031812 | 12/2009 |
| EP | 0086869 | 8/1983 |
| EP | 0161597 | 11/1985 |
| EP | 0318167 | 5/1989 |
| EP | 0570221 | 11/1993 |
| EP | 0659647 | 6/1995 |
| EP | 879844 | 11/1998 |
| EP | 0972727 | 1/2000 |
| EP | 0796199 | 2/2001 |
| EP | 0940240 | 10/2002 |
| EP | 1308263 | 5/2003 |
| EP | 1479716 | 11/2004 |
| EP | 1666530 | 6/2006 |
| EP | 1754744 | 2/2007 |
| EP | 1921023 A1 | 5/2008 |
| EP | 1939099 | 7/2008 |
| EP | 2266894 | 12/2010 |
| EP | 2386584 A1 | 11/2011 |
| GB | 1078326 | 8/1967 |
| GB | 2322100 | 8/1998 |
| JP | 52123043 U | 3/1976 |
| JP | 58029618 | 2/1983 |
| JP | 3140847 | 1/1994 |
| JP | H08067758 | 3/1996 |
| JP | 2000128255 | 5/2000 |
| JP | P310847 | 12/2000 |
| JP | 2001310429 | 11/2001 |
| JP | 2001315277 | 11/2001 |
| JP | 2003292663 | 10/2003 |
| JP | 200418101 | 1/2004 |
| JP | 2004018101 | 1/2004 |
| JP | 2004067820 A | 3/2004 |
| JP | 2004168421 | 6/2004 |
| JP | 2004330464 | 11/2004 |
| JP | 2005138508 A | 6/2005 |
| JP | 2005272542 | 10/2005 |
| JP | 2006096390 | 4/2006 |
| JP | 2006130814 | 5/2006 |
| JP | 200791323 | 4/2007 |
| JP | 2009066856 A | 4/2009 |
| JP | 2009190756 A | 8/2009 |
| JP | 2011104890 | 6/2011 |
| JP | 2011212968 A | 10/2011 |

(56) References Cited

FOREIGN PATENT DOCUMENTS

| | | |
|---|---|---|
| KR | 2003036558 | 5/2003 |
| KR | 2004017234 | 2/2004 |
| KR | 101196666 | 11/2012 |
| TW | 393427 | 6/2000 |
| TW | 200404848 | 4/2004 |
| TW | M362648 | 8/2009 |
| TW | 201021747 | 6/2010 |
| WO | 1994013460 | 6/1994 |
| WO | 9729150 | 8/1997 |
| WO | 1998016575 | 4/1998 |
| WO | 0119733 | 3/2001 |
| WO | 0132758 | 5/2001 |
| WO | 0153079 | 7/2001 |
| WO | 03076497 | 9/2003 |
| WO | 03099913 | 12/2003 |
| WO | 2004104075 | 12/2004 |
| WO | 2006042908 | 4/2006 |
| WO | 2006124369 | 11/2006 |
| WO | 2007020074 | 2/2007 |
| WO | 2008030953 | 3/2008 |
| WO | 2008038750 | 4/2008 |
| WO | 2008045944 | 4/2008 |
| WO | 2008057878 | 5/2008 |
| WO | 2008080111 | 7/2008 |
| WO | 2009035580 | 3/2009 |
| WO | 2010006272 | 1/2010 |
| WO | 2010019146 | 2/2010 |
| WO | 2010076701 A1 | 7/2010 |
| WO | 2010111869 | 10/2010 |
| WO | 2011005856 | 1/2011 |
| WO | 2011036272 | 3/2011 |
| WO | 2011036272 A2 | 3/2011 |
| WO | 2011076637 | 6/2011 |
| WO | 2011141044 | 11/2011 |
| WO | 2012020106 | 2/2012 |
| WO | 2012025584 | 3/2012 |
| WO | 2012044730 | 4/2012 |
| WO | 2012055797 | 5/2012 |
| WO | 2012099682 | 7/2012 |

OTHER PUBLICATIONS

International Search Report dated Jan. 30, 2013, relating to PCT/US2012/042737.
Borealis AG, DAPLOY(TM) HMS Polypropylene for Foam Extrusion, 2010, 20 pages.
International Search Report dated Jul. 29, 2013, relating to International Application No. PCT/US2012/043016, 25 pages.
Machine English translation of JP 2006-130814.
International Search Report and Written Opinion dated Sep. 17, 2013, relating to International Application No. PCT/US2012/041395.
International Search Report dated Feb. 26, 2013, relating to International Application No. PCT/US2012/043018.
International Search Report dated Nov. 19, 2012, relating to International Application No. PCT/US2012/041395.
International Search Report dated Jan. 29, 2013, relating to International Application No. PCT/US2012/043017.
International Search Report dated Jul. 30, 2012, relating to International Application No. PCT/US2012/041397.
International Search Report and Written Opinion dated Apr. 16, 2014, relating to International Application No. PCT/US2013/075013.
International Search Report and Written Opinion dated Apr. 21, 2014, relating to International Application No. PCT/US2013/074923.
International Search Report and Written Opinion dated Apr. 22, 2014, relating to PCT/US2013/074965.
International Search Report and Written Opinion dated Apr. 25, 2014, relating to PCT/US2013/075052.
International Search Report dated Mar. 11, 2014, relating to International Application No. PCT/US2013/66811.
Machine English translation of EP0086869.
Singapore Office Action dated Dec. 18, 2014 for Singapore Application No. 2014002273.
Third-Party Submission Under 37 CFR 1.290 filed on Feb. 26, 2015 in U.S. Appl. No. 13/491,007.
Office Action dated Apr. 30, 2015 for U.S. Appl. No. 14/462,073.
Office Action dated Apr. 14, 2015 for U.S. Appl. No. 14/106,212.
Office Action dated Apr. 10, 2015 for U.S. Appl. No. 14/106,358.
English translation of Spanish Search Report of Application No. 201490025, dated Apr. 20, 2015.
Spanish Search Report for Application No. 201490025, dated Apr. 20, 2015.
International Search Report and Written Opinion dated Jul. 3, 2014, relating to International Application No. PCT/US2014/025697.
Office action dated Apr. 11, 2014 for U.S. Appl. No. 13/526,417.
Office Action dated Aug. 21, 2014 for U.S. Appl. No. 13/526,454.
Office Action dated Sep. 25, 2014 for U.S. Appl. No. 13/526,417.
Office Action dated Aug. 19, 2014 for Chinese Application No. 201280035667.4.
Office Action dated Feb. 2, 2015 for U.S. Appl. No. 14/106,114.
Office Action dated Jan. 6, 2015 for Chinese Application No. 201280034350.9 (11 pages).
Office Action dated Jan. 9, 2015 for Chinese Application No. 201280035667.4 (22 pages).
Spanish Search Report of Application No. 201390099, dated Feb. 9, 2015.
Office Action dated Oct. 10, 2014 for U.S. Appl. No. 14/106,358.
Office Action dated Oct. 16, 2014 for U.S. Appl. No. 14/106,212.
European Search Report of Application No. 12861450.0, dated Nov. 21, 2014.
International Search Report dated Nov. 7, 2014, relating to International Application No. PCT/US2014/51508.
New Zealand First Examination Report for Application No. 619616 dated Oct. 10, 2014.
New Zealand First Examination Report for Application No. 621219 dated Nov. 17, 2014.
Third-Party Submission Under 37 CFR 1.290 filed on Dec. 9, 2014 in U.S. Appl. No. 14/063,252.
Third Party Submission Under 37 CFR 1.290 in U.S. Appl. No. 14/188,504 submitted May 11, 2015 and May 27, 2015 (43 pages).
Naguib et al., "Fundamental Foaming Mechanisms Governing the Volume Expansion of Extruded Polypropylene Foams," Journal of Applied Polymer Science, vol. 91, pp. 2661-2668, 2004 (10 pages).
Wang et al., "Extending PP\s Foamability Through Tailored Melt Strength and Crystallization Kinetics," paper 19 from the Conference Proceedings of the 8th International Conferences of Blowing Agents and Foaming Processes, May 16-17, 2006 in Munich, Germany Smithers Rapra Ltd, 2006 (14 pages).
Australian First Patent Examination Report for Application No. 2012302251 dated Jul. 9, 2015.
Office Action for Chinese Patent Application No. 201380064860.5, dated Jan. 25, 2017, 12 pages.
European Examination Report for European App. No. 13849152.7 dated Jan. 30, 2017, 3 pages.
Office Action dated Feb. 15, 2017 for U.S. Appl. No. 14/858,193.
Singapore Office Action and Written Opinion dated Feb. 14, 2017 for Singapore Application No. 11201504327V, 6 pages.
Office Action dated Feb. 24, 2017 for U.S. Appl. No. 14/188,504.
Office Action dated Feb. 28, 2017 for U.S. Appl. No. 15/004,263.
Office Action dated Mar. 6, 2017 for U.S. Appl. No. 14/108,142.
Chinese Office Action for Chinese App. No. 201480052411.3 dated Feb. 28, 2017, 16 pages.
New Zealand First Examination Report for New Zealand Application 708546 received Feb. 23, 2017, 2 pages.
Singapore Office Action and Written Opinion dated Dec. 13, 2016 and received on Feb. 28, 2017 for Singapore Application No. 11201504333Y, 6 pages.
Office Action for Chinese Patent Application No. 201380065116.7, dated Mar. 1, 2017, 3 pages.
Office Action dated Mar. 15, 2017 for U.S. Appl. No. 14/106,212.
Office Action dated Mar. 17, 2017 for U.S. Appl. No. 14/106,276.
Office Action dated Mar. 20, 2017 for U.S. Appl. No. 14/188,504.

(56) References Cited

OTHER PUBLICATIONS

Chinese Office Action dated Mar. 10, 2017 for Chinese Patent Application 201480007369.3, 11 pages.
New Zealand Examination Report for New Zealanc Application No. 708463 received Mar. 16, 2017, 3 pages.
Office Action dated Mar. 24, 2017 for U.S. Appl. No. 14/506,906.
Office Action dated Mar. 30, 2017 for U.S. Appl. No. 15/137,657.
Supplemental European Search Report for European App. No. 14836418 dated Feb. 23, 2017, 6 pages.
Office Action dated Apr. 7, 2017 for U.S. Appl. No. 14/063,252.
Chinese Office Action for Chinese Application No. 201380065127.5 dated Apr. 1, 2017, 14 pages.
Japanese Office Action for Japanese Application No. 2014-515882, dated Apr. 4, 2017, 6 pages.
New Zealand Examination Report for New Zealand Application No. 708552 received on Mar. 29, 2017, 2 pages.
Australian Search Report for Australian App. No. 2013359028, dated Apr. 10, 2017, 5 pages.
Australian Search Report for Australian App. No. 20133358988 dated Apr. 11, 2017, 4 pages.
Chinse Office Action for Chinese Patent App. No. 201511030247.9 dated Apr. 5, 2017, 12 pages.
Chinese Office Action for Chinese App. No. 201380065089.3 received Apr. 21, 2017, 10 pages.
Applied Plastics Engineering Handbook, 1st edition, edited by Myer Kutz, published Jul. 20, 2011, 2 pages.
Chinese Office Action for Chinese App. No. 201380065781.6 dated May 10, 2017, 11 pages.
Office Action dated Jun. 7, 2017 for U.S. Appl. No. 15/388,319; (pp. 1-21).
Chinese Office Action for Chinese Application No. 201280051426.9 received May 15, 2017, 12 pages.
Chinese Office Action for Chinese App. No. 201380041896.1 dated May 22, 2017, 9 pages.
Taiwan Office Action for Taiwan App. No. 101121655 received Jun. 14, 2017, 29 pages.
Australian Examiner's Report for Australian App. No. 2014244210 received Jun. 16, 2017, 4 pages.
European Examination Report for European App. No. 13863308.6 dated May 17, 2017, 3 pages.
Extended European Search Report for European App. No. 14836418.5 dated Jun. 6, 2017, 14 pages.
Office Action dated Jun. 13, 2017 for U.S. Appl. No. 14/858,193; (pp. 1-21).
Japanese Office Action for Japanese Patent App. No. 2015-539838 dated Jun. 6, 2017, 19 pages.
New Zealand Examination Report for New Zealand Application 708546 received Jul. 11, 2017, 2 pages.
Office Action dated Jul. 19, 2017 for U.S. Appl. No. 15/004,263; (pp. 1-17).
European Examination Report for European App. No. 13849152.7 dated Jun. 29, 2017, 4 pages.
Taiwan Office Action for Taiwan App. No. 102138786 received on Aug. 9, 2017, 25 pages.
Office Action dated Aug. 22, 2017 for U.S. Appl. No. 14/188,504; (pp. 1-9).
Australian Examination REport for Australian App. No. 2016204692 received Aug. 15, 2017, 3 pages.
German Office Action for German App. No. 11 2012 002 042.1 received on Sep. 8, 2017, 20 pages.
Chinese Office Action dated Sep. 21, 2017 for Chinese Patent Application 201480007369.3, 4 pages.
Taiwan Office Action for Taiwan Pat. App. No. 101121656 dated Aug. 1, 2017, 16 pages.
Office Action dated Oct. 18, 2017 for U.S. Appl. No. 14/063,252; (pp. 1-17).
Chinese Office Action for Chinese Application No. 201380065127.5 dated Sep. 27, 2017, 19 pages.
Office Action dated Oct. 26, 2017 for U.S. Appl. No. 15/139,573; (pp. 1-8).
Extended European Search Report for European Application No. 13863308.6 dated Jul. 19, 2016, 8 pages.
Office Action dated Aug. 11, 2016 for U.S. Appl. No. 14/108,110.
Chinese Office Action dated Aug. 3, 2016 for Chinese Patent Application 201480007369.3, 13 pages.
Office Action dated Sep. 1, 2016 for U.S. Appl. No. 14/106,212.
Australian First Patent Examination Report for Application No. 2013359097 dated Aug. 26, 2016, 3 pages.
British Examination Report for GB Applicaiton No. GB1400762.9, dated Aug. 8, 2016, 2 pages.
Extended European Search Report for European Application No. 13863546.1 established Jul. 12, 2016, 7 pages.
Office Action dated Aug. 9, 2016 for U.S. Appl. No. 14/108,142.
Jacoby, Philip, "Recent Insights on the Use of Beta Nucleation to Improve the Thermoforming Characteristics of Polypropylene," Society of Plastics Engineers, Annual Technical Conference Proceedings, ANTEC 2012, Apr. 2012, pp. 2292-2296.
Singapore Written Opinion for Singapore Patent Application No. 11201504756T established Jul. 19, 2016, 7 pages.
Office Action dated Sep. 27, 2016 for U.S. Appl. No. 14/725,319.
Office Action dated Oct. 7, 2016 for U.S. Appl. No. 14/739,510.
Japanese Office Action for Japanese Application No. 2014-515882, dated Aug. 30, 2016, 6 pages.
Mexican Office Action for Mexican Application MX/a/2013/014993 received on Sep. 27, 2016, 6 pages.
New Zealand Examination Report for New Zealanc Application No. 708463 received Oct. 3, 2016, 3 pages.
New Zealand Examination Report for New Zealand Application No. 708552 received on Oct. 7, 2016, 4 pages.
New Zealand First Examination Report for New Zealand Application 708546 received Sep. 26, 2016, 4 pages.
Russian Office Action for Russian Application No. 2014101298 received Sep. 30, 2016, 6 pages.
European Examination Report for European App. No. 12727994.1 received on Sep. 23, 2016, 4 pages.
Chinese Office Action for Chinese App. No. 201380065089.3 received Sep. 30, 2016, 12 pages.
European Search Report for European App. No. 13849152.7 received Sep. 16, 2016, 3 pages.
Australian Patent Examination Report for Australian App. No. 2013334155 dated Oct. 24, 2016, 7 pages.
Taiwan Office Action for Taiwan Pat. App. No. 102146299 received on Oct. 21, 2016, 7 pages.
Third Party Observation filed in European Patent App. No. 12727994.1 received on Nov. 4, 2016, 11 pages.
International Standard ISO 16790:2005(E), 20 pages.
S. Muke et al., The Melt Extensibility of Polypropylene, Polym. Int. 2001,515-523, 9 pages.
P. Spitael and C.W. Macosko, Strain Hardening in Polypropylenes and its Role in Extrusion Foaming, Polym. Eng. Sci. 2004, 2090-2100.
Combined Search and Examination Report for Great Britain App. No. GB1616321.4 received Oct. 12, 2016, 4 pages.
British Examination Report for GB App. No. 1400762.9 received Oct. 12, 2016, 2 pages.
Chinese Office Action for Chinese Applicaiton 201380065781.6 received Oct. 18, 2016, 33 pages.
Research Progress of Polypropylene Foamed Material, Baiquan Chen et al., Plastics Manufacture, No. 12, pp. 55-58.
Modification and Formulation of Polypropylene, Mingshan Yang edits, Chemical Industry Press, p. 43, the second paragraph from the bottom, Jan. 31, 2009, 17 pages.
Extended European Search Report for European App. No. 13863649.3 received Sep. 27, 2016, 9 pages.
Office Action dated Nov. 4, 2016 for U.S. Appl. No. 13/961,411.
Chinese Office Action for Chinese Application No. 201280051426.9 received Nov. 1, 2016, 9 pages.
English Summary of Chinese Office Action for Application Serial No. 201380041896.1, dated Nov. 11, 2016, 11 pages.
Extended European Search Report for European App. No. 14775300.8 dated Oct. 24, 2016, 9 pages.
Office Action dated Nov. 18, 2016 for U.S. Appl. No. 14/718,836.

(56) References Cited

OTHER PUBLICATIONS

Typical Engineering Properties of Polypropylene information sheet, Ineos Olefins and Polymers USA, archived at https://web.archive.org/web/20160501000000*/http://www.ineos.com/globalassets/ineos-group/businesses/ineos-olefins-and-polymers-usa/products/technical-information-patents/ineos-engineering-properties-of-pp.pdf, Mar. 2016, p. 1.
Office Action dated Dec. 14, 2016 for U.S. Appl. No. 14/211,553.
Office Action dated Dec. 22, 2016 for U.S. Appl. No. 14/858,158.
Gulf Cooperation Council Examination Report for GCC Patent App. No. GC2012-21529 received on Nov. 14, 2016, 6 pages.
Office Action dated Dec. 28, 2016 for U.S. Appl. No. 14/106,276.
Office Action dated Jan. 4, 2017 for U.S. Appl. No. 14/108,110.
Spanish Search Report for Spanish App. No. 201490025 received Dec. 23, 2016, 5 pages.
Japanese Office Action for Japanese Patent App. 2014-516089 dated Dec. 20, 2016, 6 pages.
European Examination Report for European App. No. 12727994.1 received on Jan. 25, 2016, 4 pages.
Japanese Office Action for Japanese App. No. 2014-528384 received Dec. 6, 2016, 15 pages.
Singapore Office Action and Written Opinion received Feb. 6, 2017 for Singapore Application No. 11201504330U, 6 pages.
Office Action dated Feb. 7, 2017 for U.S. Appl. No. 13/491,007.
Cook's Info, "Microwave Ovens", available at http://www.cooksinfo.com/microwave-ovens, accessed on Feb. 5, 2016.
Antunes et al., 'Heat Transfer in Polypropylene-Based Foams Produced Using Different Foaming Processes', Advanced Engineering Materials, 11, No. 10 (2009), 811-817.
Excerpts from Frank Kreith, Principles of Heat Transfer, 3rd ed., Intext Educational Publishers (1973).
Excerpts from James M. Gere, Mechanics of Materials, 5th ed., Brooks/Cole (2001).
Technical data sheet of HIFAX CA 60 A, obtained from https://www.lyondellbasell.com/en/polymers/p/Hifax-CA-60-A/d372c484-8f5a-4b2c-8674-8b7b781a1796, accessed on Feb. 4, 2016, 2 pages.
Michel Biron, "Chapter 4—Detailed Accounts of Thermoplastic Resins," Thermoplastics and Thermoplastic Composites, Technical Information for Plastics Users, Elsevier Ltd. (2007), 217-714.
Excerpts from Cornelia Vasile, "Mechanical Properties and Parameters of Polyolefins", Handbook of Polyolefins, 2nd ed., Marcel Dekker, Inc. (2000).
Williams et al., "Thermal Connectivity of Plastic Foams", Polymer Engineering and Science, Apr. 1983, vol. 23, No. 6., 293-298.
Excerpts from M.C. McCrum et al., Principles of Polymer Engineering, 2nd ed., Oxford Science Publications (1997).
Excerpts from Robert H. Perry, Perry's Chemical Engineers Handbook, 7th ed., The McGraw-Hill Companies, Inc. (1997).
Martinez-Diez et al., "The Thermal Conductivity of a Polyethylene Foam Block Produced by a Compression Molding Process", Journal of Cellular Plastics, vol. 37 (2001), 21-42.
R. Coquard and D. Baillis, Journal of Heat Transfer, 2006, 128(6): 538-549.
A. R. Katritzky et al., "Correlation and Prediction of the Refractive Indices of Polymers by QSPR," J. Chem. Inf. Comput. Sci., 38 (1998), 1171-1176.
M. Antunes et al., 'Heat Transfer in Polyolefin Foams,' Heat Transfer in Multi-Phase Materials, A. Ochsner and G. E. Murch, Eds. Springer-Verlag Berlin Heidelberg, 2011, 131-161.
Inter Partes Review Petition for U.S. Pat. No. 8,883,280 (2101 pages) [Submitted in multiple parts—section 1].
Inter Partes Review Petition for U.S. Pat. No. 8,883,280 (2101 pages) [Submitted in multiple parts—section 2].
Inter Partes Review Petition for U.S. Pat. No. 8,883,280 (2101 pages) [Submitted in multiple parts—section 3].
Inter Partes Review Petition for U.S. Pat. No. 8,883,280 (2101 pages) [Submitted in multiple parts—section 4].
English summary of Mexican Office Action for Application Serial No. MX/a/2013/014993, dated Apr. 27, 2016, 5 pages.
Japanese Office Action for Japanese Patent Application No. 2014-528384, dated Mar. 1, 2016.
International Preliminary Report on Patentability dated Feb. 16, 2016, relating to International Application No. PCT/US2014/051508.
English Summary of Chinese Office Action for Application Serial No. 201380041896.1, dated Mar. 18, 2016, 7 pages.
Extended European Search Report for European Application No. 13827981.5-1708/2888092 PCT/US2013/053935, dated Feb. 19, 2016.
Australian First Patent Examination Report for Application No. 2012271047, dated Feb. 29, 2016.
N. N. Najib, N.M. Manan, A.A. Bakar, and C.S. Sipaut, Effect of Blowing Agent Concentration on Cell Morphology and Impact Properties of Natural Rubber Foam, Journal of Physical Science, vol. 20(1), 13-25, 2009 (13 pages).
Nigel Mills, Polymer Foams Handbook, Fig. 2.2, 1st ed. 2007 (2 pages).
University of Massachusetts, Advanced Plastics Processing Lecture, Lecture 11: Foam Processes, Slide 4 (Nov. 11, 2012) (2 pages).
Australian Second Patent Examination Report for Application No. 2012302251, dated Feb. 26, 2016.
Doerpinghaus et al., 'Separating the effects of sparse long-chain branching on rheology from those due to molecular weight in polyethylenes', Journal of Rheology, 47, 717 (2003).
English Summary of Chinese Office Action for Application Serial No. 201280051426.9, dated Apr. 29, 2016, 5 pages.
English translation of Japanese Office Action for Japanese Application No. 2014-516089, dated May 10, 2016.
Third Party Submission Under 37 CFR 1.290 filed on May 12, 2016 in U.S. Appl. No. 14/739,510.
Lugao, A.B. et al., HMSPP—New Developments, Chemical and Environmental Technology Center, IPEN—Progress Report, 2002-2004 (1 page).
Davesh Tripathi, Practical Guide to Polypropylene, 2002 (5 pages).
Jinghua Tian et al., The Preparation and Rheology Characterization of Long Chain Branching Polypropylene, Polymer, 2006 (9 pages).
Bc. Lukas Kovar, High Pressure Crystallization of Long Chain Branched Polypropylene, Master Thesis, Thomas Bata University in Zlin, 2010 (83 pages).
Office Action dated Jun. 30, 2016 for U.S. Appl. No. 14/106,276.
Australian First Patent Examination Report for Application No. 2012363114, dated Jun. 15, 2016, 4 pages.
Office Action for Chinese Patent Application No. 201380064860.5, dated Jun. 2, 2016 including English language summary, 13 pages.
Singapore Office Action and Written Opinion dated May 26, 2016 for Singapore Application No. 11201504333Y.
Singapore Office Action and Written Opinion dated May 27, 2016 for Singapore Application No. 11201504330U.
Singapore Office Action and Written Opinion dated May 27, 2016 for Singapore Application No. 11201504327V.
Office Action dated Jun. 10, 2016 for U.S. Appl. No. 14/188,504.
Office Action dated Mar. 10, 2016 for U.S. Appl. No. 14/462,073.
Notice of Acceptance dated Jun. 10, 2016 for Australian Application No. 2012302251.
Office Action dated Jul. 28, 2016 for U.S. Appl. No. 14/211,553.
Office Action for Chinese Patent Application No. 201380065116.7, dated Jun. 28, 2016, including English language summary, 12 pages.
Australian First Patent Examination Report for Application No. 2013334155, dated May 23, 2016, 4 pages.
Extended European Search Report for European Application No. 13862331.9-1708/2931627 PCT/US2013/074923, dated Jul. 7, 2016.
English translation of Russian Office Action for Application Serial No. 2014101298, dated Jul. 22, 2016, 7 pages.
Office Action dated Nov. 2, 2017 for U.S. Appl. No. 15/650,424; (pp. 1-6).
Extended European Search Report for European App. No. 17182869.2 dated Oct. 19, 2017, 5 pages.
Extended European Search Report for European App. No. 17181231.6 dated Nov. 7, 2017, 5 pages.
Office Action dated Nov. 14, 2017 for U.S. Appl. No. 14/862,552; (pp. 1-14).

(56) References Cited

OTHER PUBLICATIONS

"All You Need to Know About Polypropylene, Part 1," Creative Mechanisms Blog. (Year: 2016).
Rejection Decions for Chinese Patent App. No. 201280051426.9 received on Nov. 14, 2017, 8 pages.
ASTM D883-17, an American Society for Testing and Materials "Standard Terminology Relating to Plastics," 2017, 16 pages.
ASTM D4101-14, an American Society for Testing and Materials "Standard Standard Specification for Polypropylene Injection and Extrusion Materials," 2014, 17 pages.
Lyondellbasell, Polypropylene, Impact Copolymer, https://www.lyondellbasell.com/en/products-technology/polymers/resin-type/polypropylene-impact-copolymer/, accessed on Nov. 29, 2017, 5 pages.
ASTM D883-12e1, an American Society for Testing and Materials "Standard Terminology Relating to Plastics," 2012, 16 pages.
ASTM D4101-11, an American Society for Testing and Materials "Standard Standard Specification for Polypropylene Injection and Extrusion Materials," 2011, 17 pages.
Extended European Search Report for European App. No. 14836418.5 dated Jan. 30, 2018, 4 pages.
Canadian office action for Canadian App. No. 2,842,325 dated Jan. 24, 2018, 4 pages.
Japanese Office Action for Japanese App. No. 2016-501945 dated Jan. 23, 2018.
European Examination Report for European App. No. 13849152.7 dated Jan. 4, 2018, 3 pages.
Chinese Office Action for Chinese App. No. 201380065781.6 dated Nov. 28, 2017, 10 pages.
Office Action dated Jan. 16, 2018 for U.S. Appl. No. 15/388,319; (pp. 1-13).
Office Action dated Jan. 19, 2018 for U.S. Appl. No. 15/004,263; (pp. 1-18).

\* cited by examiner

INSULATED CONTAINER WITH MOLDED BRIM

PRIORITY CLAIM

This application claims priority under 35 U.S.C. § 119(e) to U.S. Provisional Application Ser. No. 61/498,435, filed Jun. 17, 2011 and Ser. No. 61/618,632, filed Mar. 30, 2012, which are expressly incorporated by reference herein.

BACKGROUND

The present disclosure relates to vessels, and in particular to insulated containers, such as cups, for containing hot or cold beverages or food. More particularly, the present disclosure relates to an insulated cup formed from polymeric materials.

SUMMARY

An insulated container, such as a cup, in accordance with the present disclosure includes a bottom and a side wall extending upwardly from the bottom. The side wall cooperates with the bottom to form a base having an interior region.

In illustrative embodiments, a brim is coupled to a rim of the side wall of the base after the base has been formed without rolling any portion of the rim of the side wall. The rim of the side wall is made of a first polymeric material and the brim is made of a different second polymeric material. In illustrative embodiments, the base is made of an insulative cellular non-aromatic polymeric material and the separate brim is made of a non-cellular polymeric material.

In illustrative embodiments, the brim is formed by compression molding. The compression-molded brim is then coupled to the rim of the side wall of the base to frame an opening into the interior region formed in the base.

Additional features of the present disclosure will become apparent to those skilled in the art upon consideration of illustrative embodiments exemplifying the best mode of carrying out the disclosure as presently perceived.

BRIEF DESCRIPTION OF THE DRAWINGS

The detailed description particularly refers to the accompanying figures in which.

DETAILED DESCRIPTION

Figure 1:
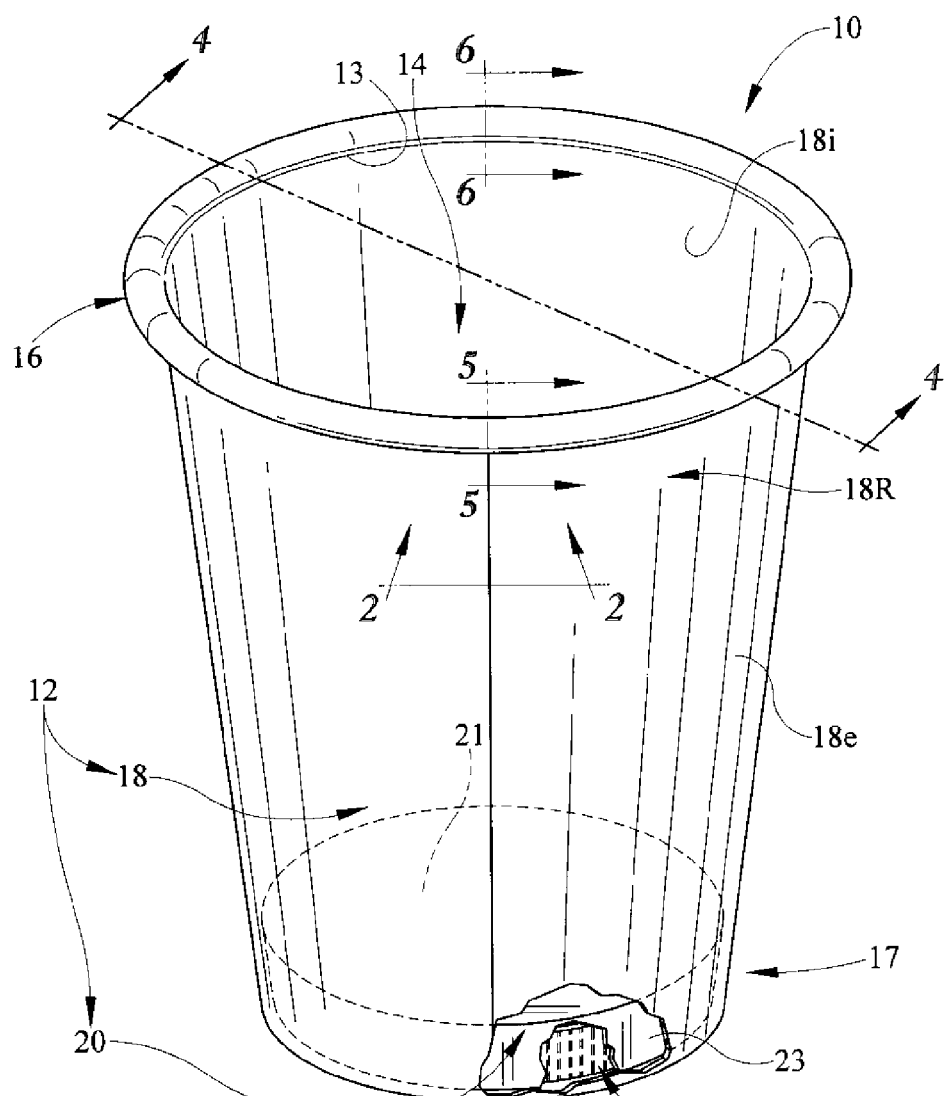
FIG. 1 is a perspective view of first embodiment of an insulative cup in accordance with the present disclosure showing that the insulative cup includes a base made from an insulative cellular non-aromatic polymeric material and formed to include an interior region and a molded brim made from a different non-aromatic polymeric material and coupled to a rim included in a top portion of the base as suggested, for example, in FIGS. 3 and 10.

An insulative cup 10 in accordance with a first embodiment of the present disclosure includes a non-molded base 12 made of a first insulative cellular non-aromatic polymeric material and formed to include an interior region 14 and a compression-molded brim 16 made of a different non-cellular non-aromatic polymeric material as shown, for example, in FIG. 1. Brim 16 is coupled to a rim 18R included in an upper portion of base 12 after base 12 has been formed and is arranged to define a mouth 13 opening into interior region 14 formed in base 12.

Figure 10:
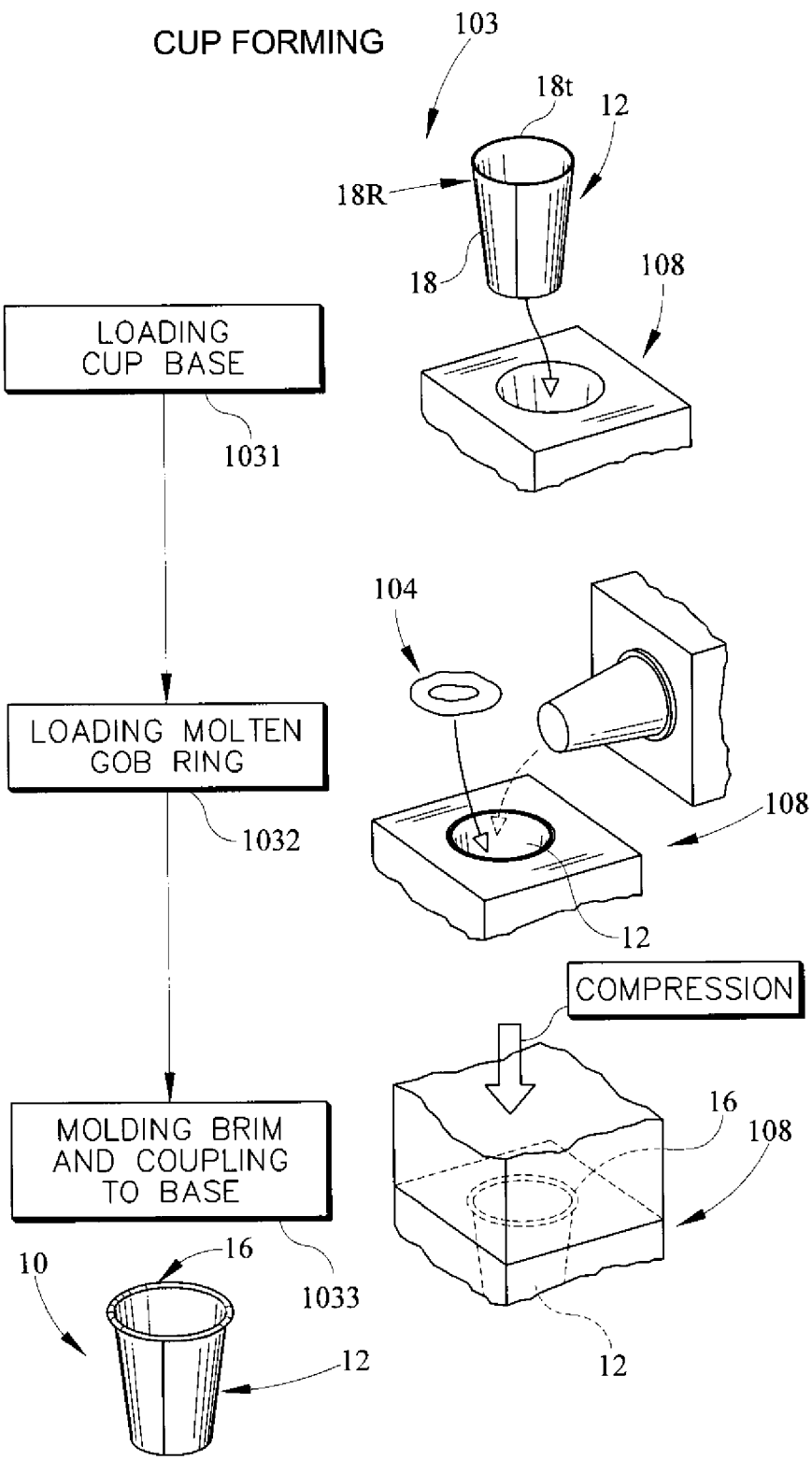
FIG. 10 is a perspective and diagrammatic view of an illustrative cup-forming process suggesting that the cup-forming process includes a base-loading step in which the base is loaded into a mold cavity, a molten-gob ring loading step in which a molten-gob ring is deposited in the mold cavity on the base, and a brim molding and coupling step in which the molten-gob ring is molded into a molded brim and coupled to the base to form the insulative cup of FIG. 1.

In illustrative embodiments, base 12 is formed from an insulative cellular non-aromatic polymeric material in accordance with an illustrative base-forming process suggested in FIG. 10. Compression-molded brim 16 is made from a different non-cellular non-aromatic polymeric material and is coupled to base 12 after base 12 has been formed to establish insulative cup 10 in an illustrative cup-forming process 103 as suggested, for example, in FIG. 10. In illustrative embodiments, the non-aromatic polymeric materials used to make base 12 and the separate brim 16 are polypropylene-based.

Figure 3:
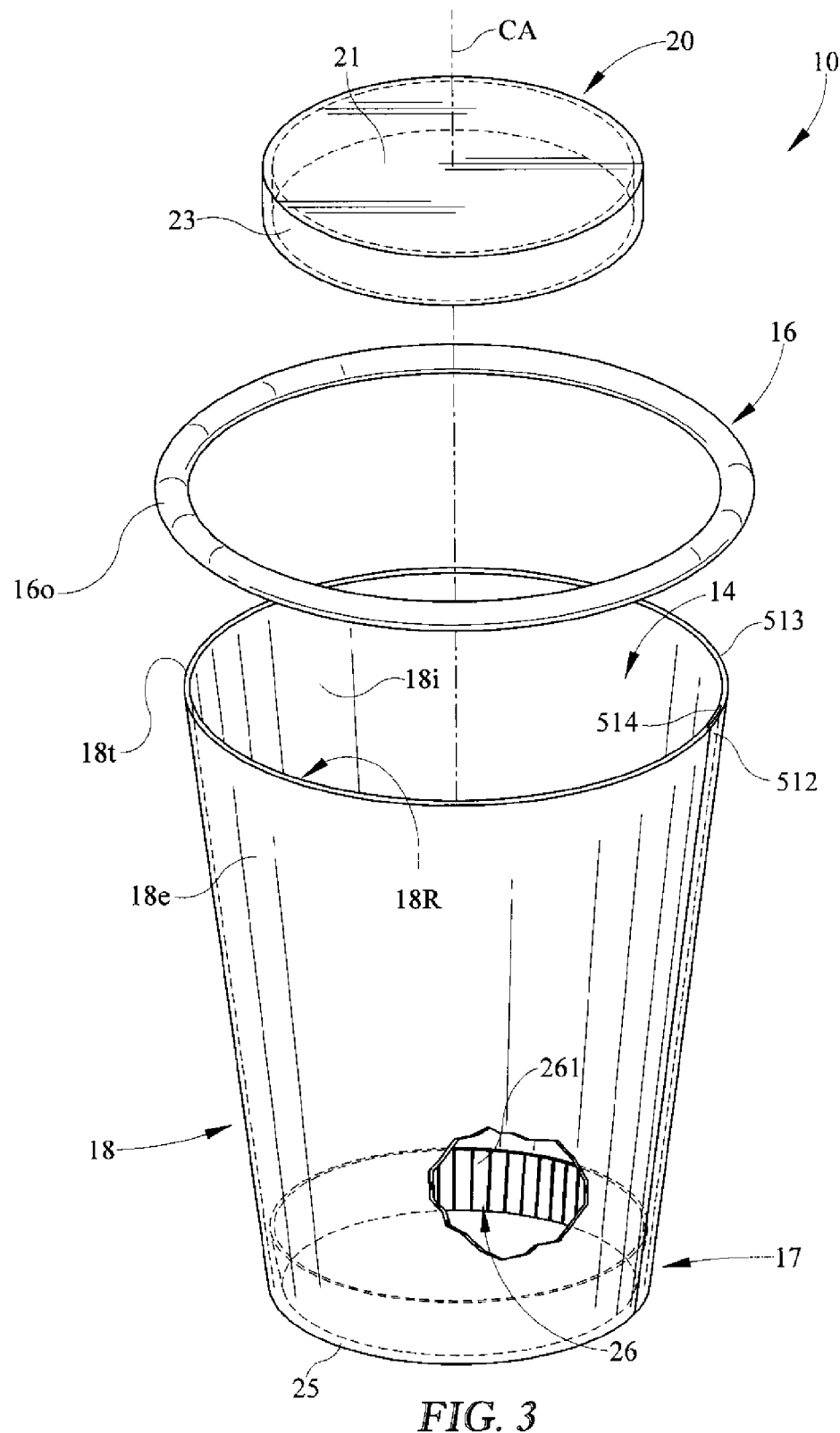
FIG. 3 is an exploded assembly view of the insulative cup of FIG. 1 showing that the molded brim is a ring-shaped endless band that is configured to be mated with a ring-shaped top surface of the rim of the side wall of the base and showing that the insulative cup includes, from top to bottom, a floor included in the base, the molded brim, a sleeve-shaped side wall included in the base, and a floor mount included in the base and coupled to a bottom portion of the sleeve-shaped side wall and configured to mate with and support the floor in a stationary position relative to the sleeve-shaped side wall as suggested in FIG. 4.
Figures 4, 4A:
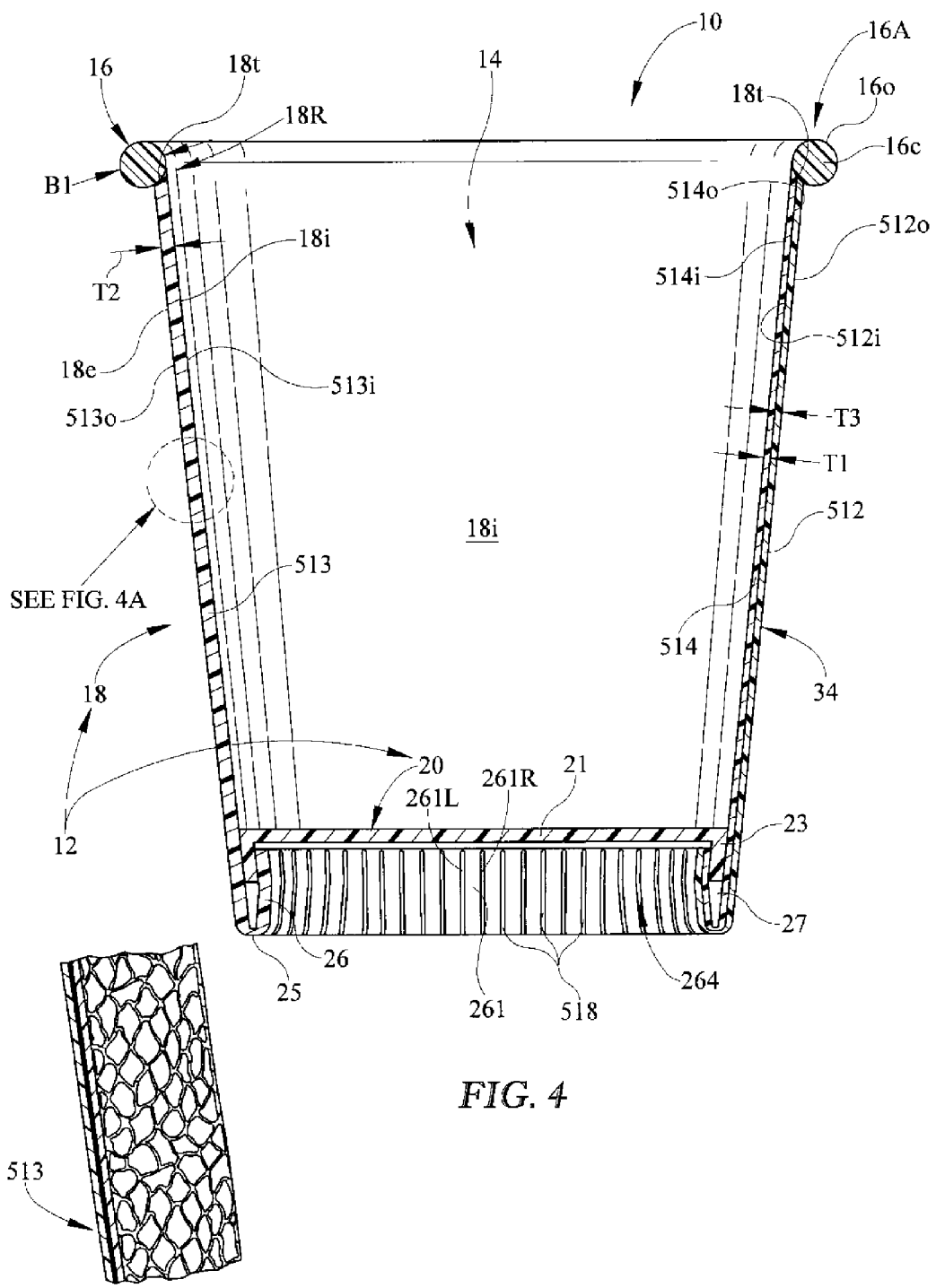
FIG. 4 is a sectional view taken along line 4-4 of FIG. 1 showing that the molded brim is coupled to a top surface of the rim of the base and that the base of the insulative cup includes a sleeve-shaped side wall extending downwardly from the molded brim, a floor mount coupled to a bottom portion of the sleeve-shaped side wall to lie below and in spaced-apart relation to the molded brim, and a floor fixed in a stationary position relative to the sleeve-shaped side wall by the floor mount.
FIG. 4A is an enlarged sectional view of a portion of the sleeve-shaped side wall included in the base of the insulative cup of FIG. 4 showing that the side wall is made from sheet that includes, from left to right, a skin comprising a film layer, an ink layer, and an adhesive layer, and a strip of insulative cellular non-aromatic polymer material coupled to the adhesive layer of the skin.

Base 12 includes a bottom 15 adapted to set on a generally flat surface and a sleeve-shaped side wall 18 rising upwardly from a peripheral edge of bottom 15 to form interior region 14 as shown, for example, in FIGS. 3 and 4. A circular terminal rim 18R is defined by an upper portion of sleeve-shaped side wall 18 as shown, for example, in FIG. 3. Both of bottom 15 and sleeve-shaped side wall 18 are made of an insulative cellular non-aromatic polymeric material in an illustrative embodiment.

Brim 16 is mated to terminal rim 18R of base 12 in accordance with the present disclosure as suggested, for example, in FIG. 10 to form insulative cup 10. Brim 16 is made of one non-cellular polymeric material while base 12 is made of a cellular polymeric material.

Bottom 15 of base 12 includes a floor mount 17 and a floor 20 as shown, for example, in FIG. 3. Floor mount 17 is coupled to a lower portion of sleeve-shaped side wall 18 and to floor 20 to support floor 20 in a stationary position relative to sleeve-shaped side wall 18 to form interior region 14 as suggested in FIG. 4. Floor mount 17 includes a floor-retaining flange 26 coupled to floor 20, a web-support ring 126 coupled to the lower end of sleeve-shaped side wall 18 and arranged to surround floor-retaining flange 26, and a connecting web 25 arranged to interconnect floor-retaining flange 26 and web-support ring 126 in illustrative embodiments as suggested in FIGS. 1, 3, and 4. It is within the scope of the present disclosure to form bottom 15 and couple bottom 15 to sleeve-shaped side wall 18 in any suitable manner.

Side wall 18 of base 12 includes an interior surface 18i facing inwardly toward interior region 14 and an exterior surface 18e facing outwardly away from interior region 14 as suggested in FIGS. 1, 3, and 4. Side wall 18 also includes a top surface 18t arranged to interconnect interior and exterior surfaces 18i, 18e and included in rim 18R as suggested in FIG. 3. In illustrative embodiments, top surface 18t is endless and, for example, ring-shaped, while each of interior and exterior surfaces 18i, 18e has a frustoconical shape as suggested in FIG. 3.

Brim 16 is an endless band as suggested in FIG. 3. Brim 16 is circular and has a round transverse cross-section in an illustrative embodiment as shown, for example, in FIGS. 3 and 4. Brim 16 has a solid core 16c and an endless tube-shaped outer surface 16o mating with rim 18R of side wall 18 of base 12 in an illustrative embodiment as suggested in FIGS. 3 and 4.

Figure 5:
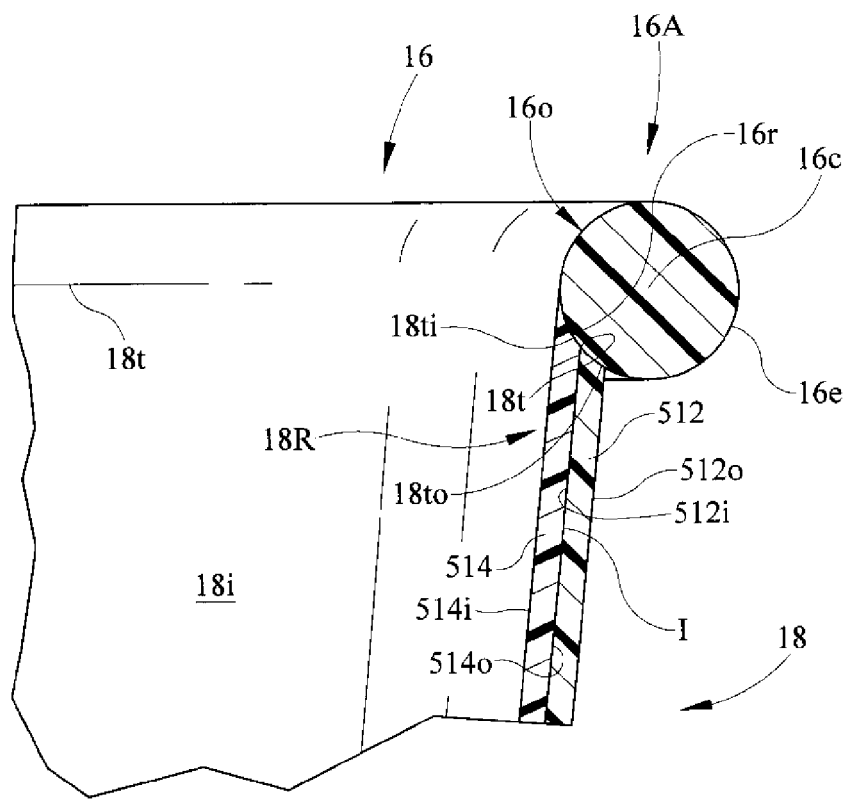
FIG. 5 is an enlarged partial sectional view of FIG. 4 showing a right side of the molded brim coupled to overlapping inner and outer upright tabs included in the sleeve-shaped side wall and showing that each upright tab has been plastically deformed to have a first thickness and a first density so that when the upright tabs overlap one another a relatively greater second thickness is established.
Figure 6:
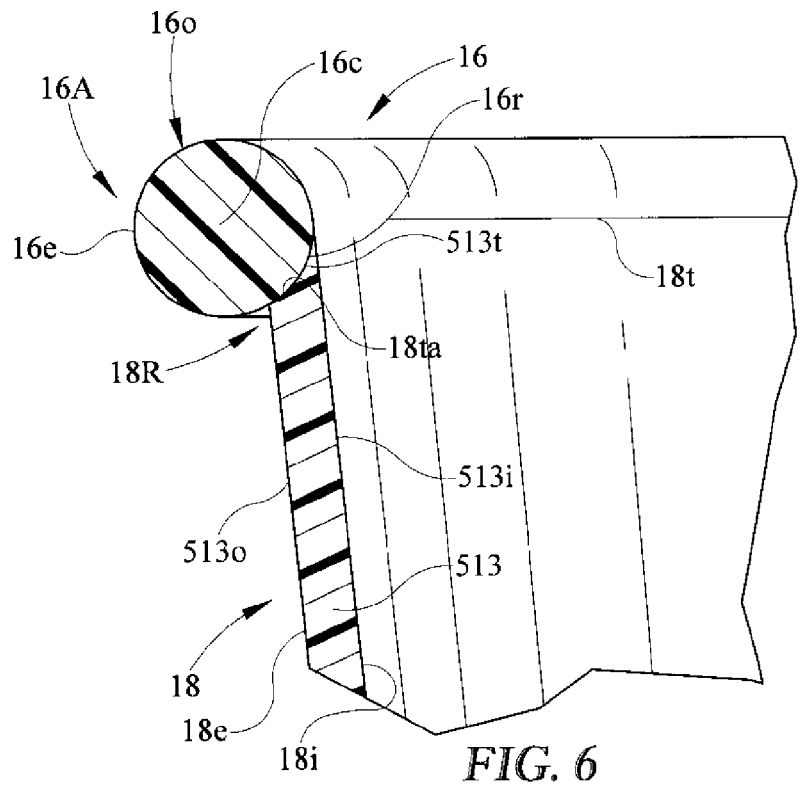
FIG. 6 is an enlarged partial sectional view of FIG. 4 showing a left side of the molded brim coupled to an upright fence included in the sleeve-shaped side wall that extends between the inner and outer upright fences and that the upright fence has the relatively greater second thickness and a relatively smaller second density.

Brim 16 is mated to top surface 18t of rim 18R of side wall 18 of base 12 to form insulative cup 10 and cause outer surface 16o of brim 16 to interconnect interior surface 18i of side wall 18 and exterior surface 18e of side wall 18 as suggested in FIGS. 4-6. Brim 16 is not a rolled brim made of the same material used to make side wall 18 during a conventional brim-rolling process but rather an endless band having a tube-shaped outer surface 16o. Brim 16 is made of a non-cellular material while base 12 is made from a cellular material. Although brim 16 has a solid core 16c in an illustrative embodiment, it is within the scope of the present disclosure to extrude a tube having a tube-shaped outer surface and join opposite ends of the tube to one another to form an endless band having a closed hollow interior region and then mate the endless band to top surface 18t of rim 18R of side wall 18 of base 12 to form a drink cup in accordance with one embodiment of the present disclosure.

Brim 16 is molded as suggested, for example, in FIG. 10 and joined to top surface 18t of rim 18R of side wall 18 of base 12 as suggested, for example, in FIGS. 3 and 10 in accordance with the present disclosure to produce insulative cup 10 made of two different materials. In illustrative embodiments, base 12 is made of an insulative cellular non-aromatic polymeric material that is polypropylened based while brim 16 is made of a non-cellular non-aromatic polymeric material that is polypropylene based. As a result of both brim 16 and base 12 both being made of polypropylene based materials, recyclability is maximized.

Brim 16 is joined to top surface 18t of rim 18R using, for example, an adhesive or heat or other suitable process. It is within the scope of the present disclosure to place base 12 in a mold cavity of a mold and inject a plastics material that is different from the materials used to make base 12 into a space formed in the closed mold to communicate with top surface 18t of rim 18R of side wall 18 of base 12 to overmold brim 16 onto top surface 18t of rim 18R of base 12. Once brim 16 is joined to top surface 18t, top surface 18t has a concave cross-section to provide top surface 18t with a concave shape arranged to face outwardly away from interior region 14 as suggested in FIGS. 4-8.

Figure 7:
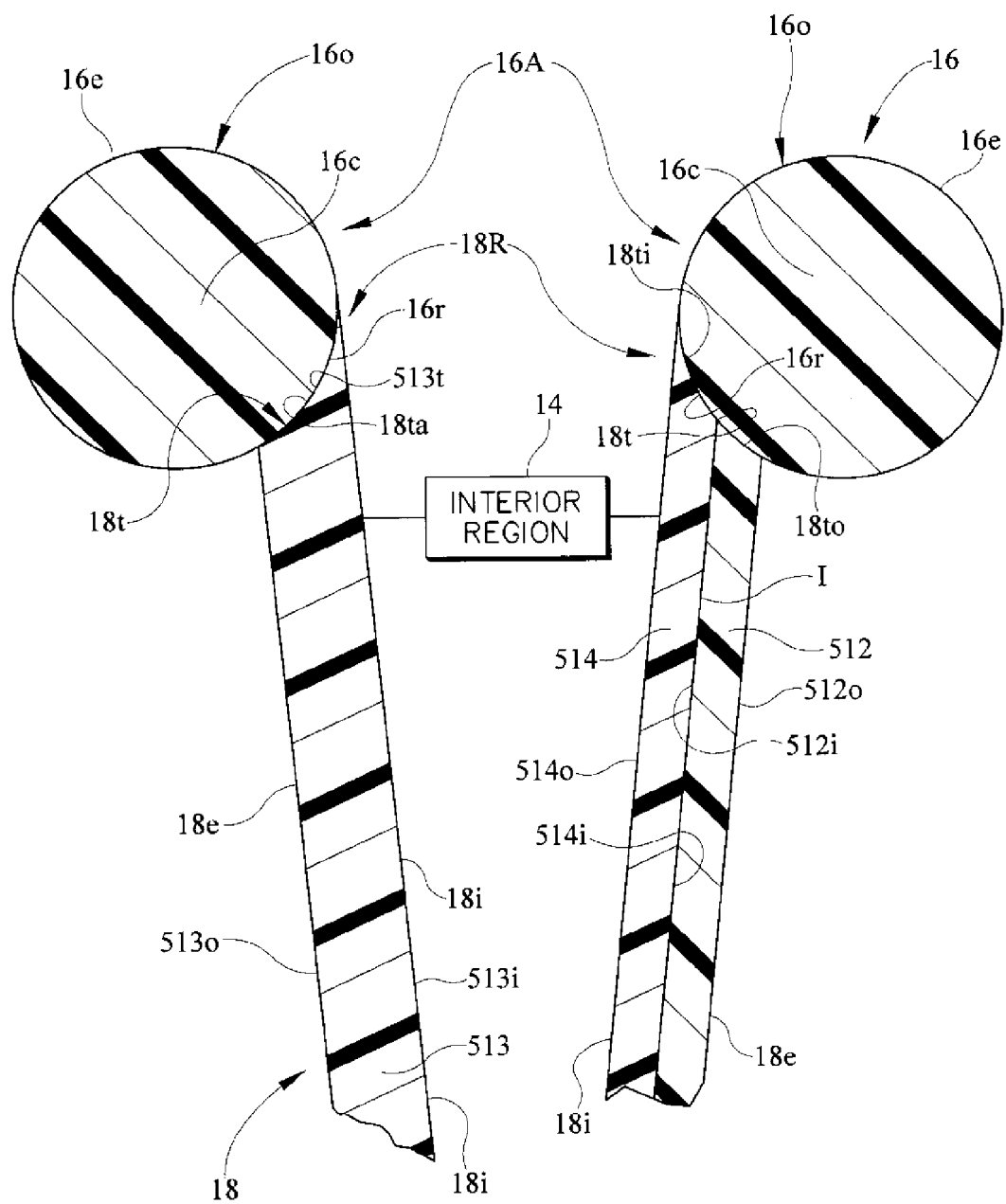
FIG. 7 is a diagrammatic and an enlarged dead section view of the molded brim of FIGS. 1 and 3-6 showing that the molded brim is coupled to a concave top surface of the rim of the side wall of the base and suggesting that the molded brim is made of one plastics material and that the rim of the side wall of the base that mates with the molded brim is made of a different plastics material.

Brim 16 includes a convex rim-engaging surface 16r that is arranged to mate to and conform with the concave top surface 18t of rim 18R of side wall 18 of base 12 as shown, for example, in FIGS. 5-7. Brim 16 also includes a convex exterior surface 16e that is arranged to extend from an inner edge of convex rim-engaging surface 16r to an outer edge of convex rim-engaging surface 16r as suggested in FIG. 7. When brim 16 is mated to rim 18R of side wall 18 of base 12, convex exterior surface 16e of brim 16 is arranged to interconnect interior and exterior surfaces 18i, 18e of rim 18R of base 12 as suggested in FIG. 7. Convex rim-engaging surface 16r and convex exterior surface 16e of brim 16 cooperate to provide brim 16 with a circular cross-sectional shape in an illustrative embodiment as shown in FIGS. 5-7.

Base 12 is formed from a strip of insulative cellular non-aromatic polymeric material as disclosed in illustrative embodiments herein. In accordance with the present disclosure, a strip of insulative cellular non-aromatic polymeric material is configured (by application of pressure—with or without application of heat) to provide means for enabling localized plastic deformation of selected regions (in, for example, side wall 18 and floor mount 17) of base 12 to provide a plastically deformed first material segment having a first thickness and first density located in a first portion of the selected region of base 12 and a second material segment having a second thickness larger than the first thickness and a second density lower than the first density located in an adjacent second portion of the selected region of base 12 without fracturing the insulative cellular non-aromatic polymeric material so that a predetermined insulative characteristic is maintained in base 12.

Side wall 18 includes a region in which localized plastic deformation is enabled by the insulative cellular non-aromatic polymeric material as suggested in FIGS. 1, 4, and 4A. Sleeve-shaped side wall 18 includes an upright inner tab 514, an upright outer tab 512, and an upright fence 513 extending between inner and outer tabs 514, 512 as suggested in FIGS. 1 and 4. Upright inner tab 514 is arranged to extend upwardly from floor 20 and configured to provide the first material segment having the smaller first thickness T1 and the higher first density in a first region of base 12. Upright outer tab 512 is arranged to extend upwardly from floor 20 and to mate with upright inner tab 514 along an interface I therebetween as suggested in FIG. 4. Upright fence 513 is arranged to interconnect upright inner and outer tabs 514, 512 and surround interior region 14. Upright fence 513 is configured to provide the second material segment having the larger second thickness T2 and the lower second density in the first region of base 12 and cooperate with upright inner and outer tabs 514, 512 to form sleeve-shaped side wall 18 as suggested in FIGS. 1 and 4.

As suggested in FIG. 7, upright inner tab 514 is configured to form a radially inner portion 18ti of top portion 18t of rim 18R of base 12 and upright outer tab 512 is configured to form a radially outer portion 18 to of top portion 18t. Upright fence 513 is configured to form another portion 18ta of top portion 18t.

Figure 8:
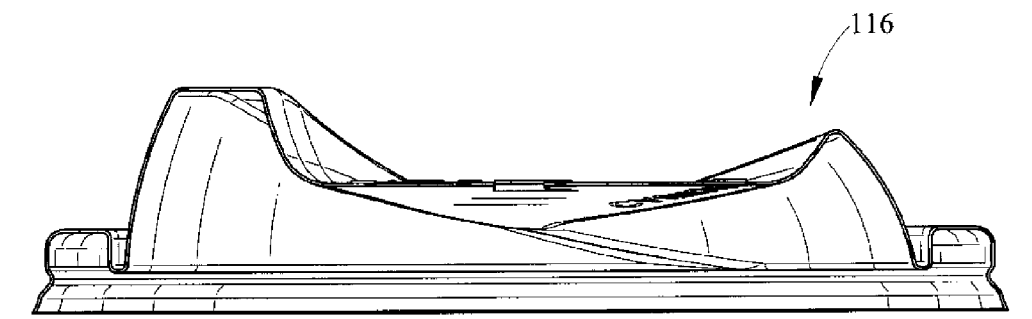
FIG. 8 is a partial sectional view of a combination of a portion of the insulative cup of FIG. 1 and a companion lid showing that the lid includes a rim that mates with the molded brim of the insulative cup as suggested in FIG. 9.
Figure 8:
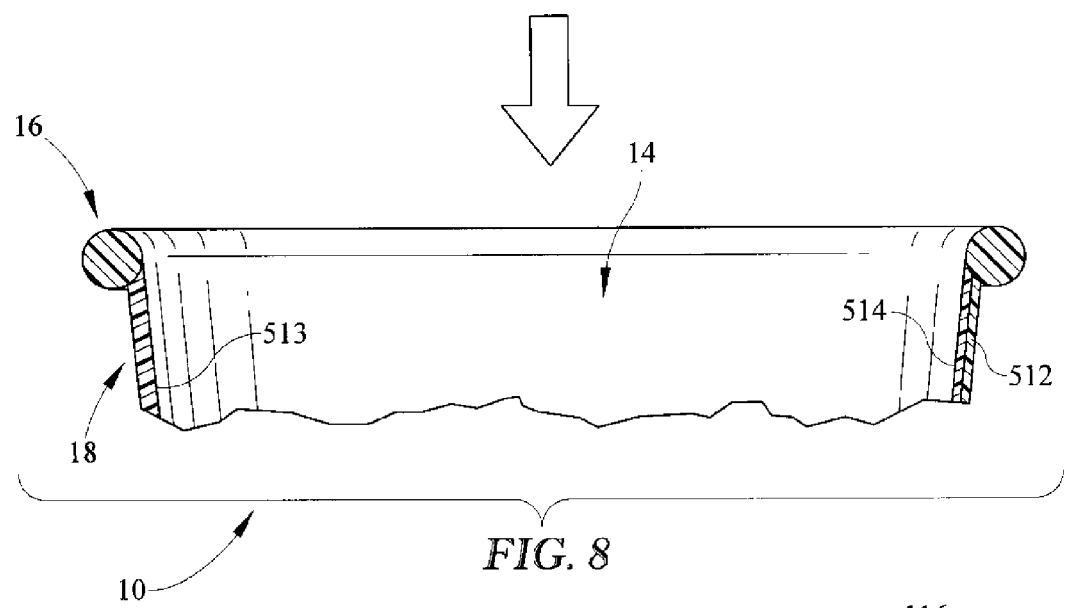

As shown in FIGS. 4 and 8, upright inner and outer tabs 514, 512 each have the smaller first thickness T1 and the higher first density and are arranged to overlap one another and cooperate together establish a third thickness T3. As an illustrative example, third thickness T3 is about equal to second thickness T2 as shown in FIG. 7. As a result, sleeve-shaped side wall 18 is provided with a smooth, unending appearance.

Figure 9:
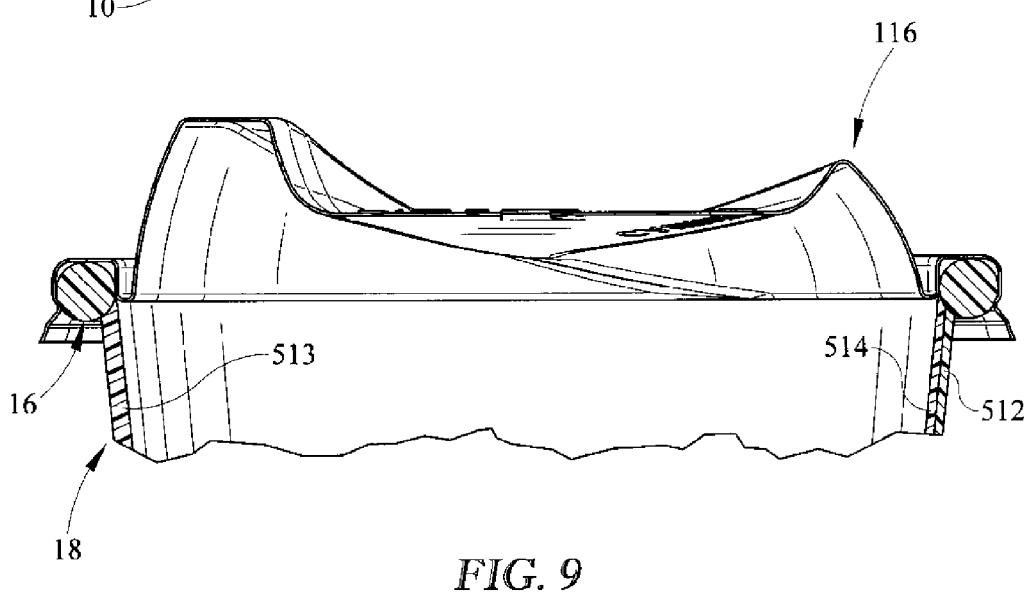
FIG. 9 is a partial sectional view of the lid and insulative cup of FIG. 8 with the lid mated to the cup so that the rim of the lid engages the molded brim of the insulative cup to close a mouth opening into the interior region formed in the base.

Molded brim 16 is coupled to the top surface 18t of rim 18R included in upper portion of sleeve-shaped side wall 18 as shown, for example, in FIGS. 1, 3, and 7. Molded brim 16 has a brim thickness B1 shown in FIGS. 4 and 7 which is generally constant around the circumference of molded brim 16. As a result, molded brim 16 provides means for mating with a container lid 116 to block products stored in interior region 14 from moving through mouth 13 as suggested in FIG. 8 and shown in FIG. 9. Molded brim 16 also provides improved hoop strength to insulative cup 10 and a uniform interface between molded brim 16 and lid 116. Molded brim 16 also permits the use of sleeve-shaped side walls that have third thickness T3 that is greater than second thickness T2.

Sleeve-shaped side wall 18 of base 12 includes tabs 514, 512 that mate to provide side wall 18 with a frustoconical shape in the illustrative embodiment shown in FIGS. 1, 3, 4, and 7. Upright inner tab 514 of side wall 18 includes an inner surface 514i bounding a portion of interior region 14 and an outer surface 514o facing toward upright outer tab 512 as shown in FIG. 7. Upright outer tab 512 includes an inner surface 512i facing toward interior region 14 and mating with outer surface 514o of upright inner tab 514 to define the interface I between upright inner and outer tabs 514, 512. Upright outer tab 512 further includes an outer face 512o facing away from upright inner tab 514.

Figure 2:
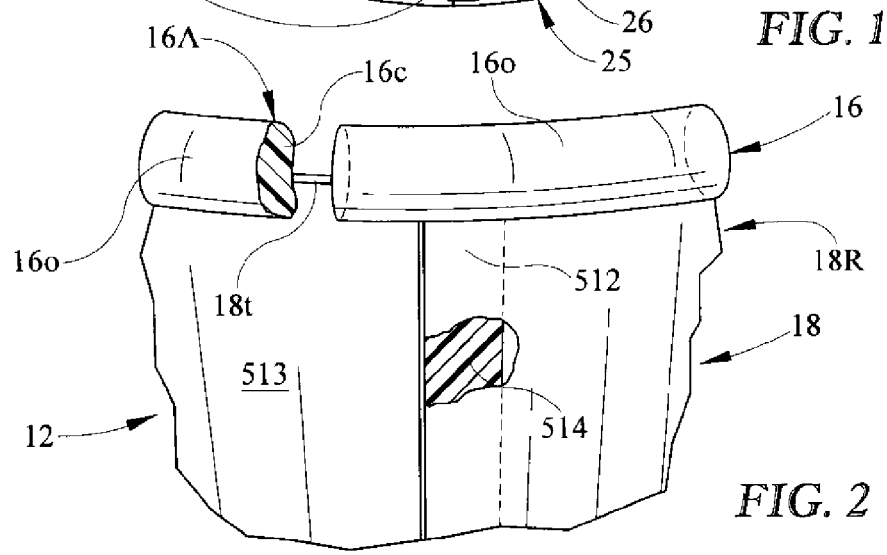
FIG. 2 is an enlarged partial perspective view of a portion of the molded brim of FIG. 1 with portions broken away to reveal that the molded brim has a solid core provided with a tube-shaped outer surface.

Upright fence 513 of side wall 18 is C-shaped in a horizontal cross-section and each of upright inner and outer tabs 514, 512 has an arcuate shape in a horizontal cross-section as suggested in FIG. 1. Upright fence 513 includes an upright left side edge 513L and an upright right side edge 513R that is arranged to lie in spaced-apart confronting relation to upright left side edge 513L in FIG. 2. Upright outer tab 512 is configured to have the higher first density and smaller first thickness T1 and mate with upright inner tab 514 also characterized by the higher first density to establish a bridge 512, 514 arranged to interconnect upright left and right side edges 513L, 513R of upright fence 513. Bridge 512, 514 is formed of plastically deformed material having the higher first density and smaller first thickness T1. As a result, bridge 512, 514 has third thickness T3 which is about equal to second thickness T2.

Upright fence 513 of side wall 18 has an inner surface 513i bounding a portion of interior region 14 and an outer surface 513o facing away from interior region 14 and surrounding inner surface 513i of upright fence 513 as shown, or example, in FIG. 4. Outer surface 513o cooperates with inner surface 513i of upright fence 513 to define a first thickness T1 therebetween. Upright inner tab 514 includes an inner surface 514i bounding a portion of interior region 14 and an outer surface 514o facing toward upright outer tab 512. Upright outer tab 512 includes an inner surface 512i facing toward interior region 14 and mating with outer surface 514o of upright inner tab 514 to define the interface I between upright inner and outer tabs 514, 512. Upright outer tab 512 further includes an outer face 512o facing away from upright inner tab 514. Inner and outer surfaces of upright inner tab 514 cooperate to define first thickness T1 therebetween that is less than the second thickness T2. Inner and outer surfaces of upright outer tab 512 cooperate to define first thickness T1 that is less than the second thickness T2.

Floor mount 17 of base 12 is coupled to a lower end of sleeve-shaped side wall 18 and to floor 20 to support floor 20 in a stationary position relative to sleeve-shaped side wall 18 to form interior region 14 as suggested in FIGS. 1, 3, and 4. Floor mount 17 includes a floor-retaining flange 26, a web-support ring 126, and a connecting web 25 as shown in FIG. 4. Floor-retaining flange 26 is coupled to floor 20 to support floor 20 in spaced-apart relation to ground underlying insulative cup 10. Web-support ring 126 is coupled to the lower end of sleeve-shaped side wall 18 and arranged to surround floor-retaining flange 26. Connecting web 25 is arranged to interconnect floor-retaining flange 26 and web-support ring 126 as suggested in FIG. 4.

Connecting web 25 is configured to provide the first material segment having the higher first density. Connecting web-support ring 126 is configured to provide the second material segment having the lower second density. Each of connecting web 25 and web-support ring 126 has an annular shape. Floor-retaining flange 26 has an annular shape. Each of floor-retaining flange 26, connecting web 25, and web-support ring 126 includes an inner layer having an interior surface mating with floor 20 and an overlapping outer layer mating with an exterior surface of inner layer as suggested in FIG. 4.

Floor 20 of insulative cup 10 includes a horizontal platform 21 bounding a portion of interior region 14 and a platform-support member 23 coupled to horizontal platform 21 as shown, for example, in FIGS. 3 and 4. Platform-support member 23 is ring-shaped and arranged to extend downwardly away from horizontal platform 21 and interior region 14 into a space 27 provided between floor-retaining flange 26 and the web-support ring 126 surrounding floor-retaining flange 26 to mate with each of floor-retaining flange 26 and web-support ring 126 as suggested in FIGS. 3 and 4. Platform-support member 23 of floor 20 has an annular shape and is arranged to surround floor-retaining flange 26 and lie in an annular space provided between horizontal platform 21 and connecting web 25.

Floor-retaining flange 26 of floor mount 17 is arranged to lie in a stationary position relative to sleeve-shaped side wall 18 and coupled to floor 20 to retain floor 20 in a stationary position relative to sleeve-shaped side wall 18 as suggested in FIGS. 1, 3, and 4. Horizontal platform 21 of floor 20 has a perimeter edge mating with an inner surface of sleeve-shaped side wall 18 and an upwardly facing top side bounding a portion of interior region 14.

Floor-retaining flange 26 of floor mount 17 is ring-shaped and includes an alternating series of upright thick and thin staves arranged to lie in side-to-side relation to one another to extend upwardly toward a downwardly facing underside of horizontal platform 21. A first 261 of the upright thick staves is configured to include a right side edge 261R extending upwardly toward the underside of horizontal platform 21. A second 262 of the upright thick staves is configured to include a left side edge 262L arranged to extend upwardly toward underside of horizontal platform 21 and lie in spaced-apart confronting relation to right side edge 261R of the first 261 of the upright thick staves. A first 260 of the upright thin staves is arranged to interconnect left and right side edges 262L, 261R and cooperate with left and right side edges 262L, 261R to define therebetween a vertical channel 263 opening inwardly into a lower interior region 264 bounded by horizontal platform 21 and floor-retaining flange 26 as suggested in FIG. 4. The first 260 of the thin staves is configured to provide the first material segment having the higher first density. The first 261 of the thick staves is configured to provide the second material segment having the lower second density.

Floor-retaining flange 26 of floor mount 17 has an annular shape and is arranged to surround a vertically extending central axis CA intercepting a center point of horizontal platform 21 as suggested in FIG. 3. The first 260 of the thin staves has an inner wall facing toward a portion of the vertically extending central axis CA passing through the lower interior region. Platform-support member 23 is arranged to surround floor-retaining flange 26 and cooperate with horizontal platform 21 to form a downwardly opening floor chamber 20C containing the alternating series of upright thick and thin staves therein.

Insulative cup 10 is formed, for example, using cup-forming process 103 as shown in FIG. 10. Cup-forming process 103 includes base-loading step 1031, a molten-gob ring loading step 1032, and a brim molding and coupling step 1033 as shown in FIG. 10. Base-loading step 1031 loads a base provides base 12 as described above and loads base 12 into a mold cavity formed in a mold 108. Molten-gob ring loading step 1032 provides a molten-gob ring 104 and loads it into the mold cavity of mold 108 on top surface 18T of base 12. Brim-molding and coupling step 1033 forms molten-gob ring 104 into molded brim 16 and couples molded brim 16 to base 12. In one example, molding and coupling happen at substantially the same time. However, it is within the scope of the present disclosure for the coupling and molding to be performed in a serialized fashion. Alternatively, molded brim 16 may be welded, glued, or otherwise attached to base 12.

Base-loading step 1031 provides base 12 as described above. Base 12 is formed from a strip of insulative cellular non-aromatic polymeric material. Reference is hereby made to U.S. application Ser. No. 13/491,007 filed Jun. 7, 2012 and titled INSULATED CONTAINER for disclosure relating to a base made from an insulative cellular non-aromatic polymeric material, which application is hereby incorporated in its entirety herein. Reference is hereby made to U.S. application Ser. No. 13/491,327 filed Jun. 7, 2012 and titled POLYMERIC MATERIAL FOR AN INSULATED CONTAINER for disclosure relating to such insulative cellular non-aromatic polymeric material, which application is hereby incorporated in its entirety herein.

A different second polypropylene polymeric material, also called a non-cellular non-aromatic polymeric material, may be a polypropylene homopolymer, an impact copolymer, mixtures thereof or the like. One illustrative example is a high crystalline polypropylene homopolymer, available as F020HC from Braskem. Another illustrative example is a polymer commercially available as PRO-FAX SC204™ (available from LyndellBasell Industries Holdings, B.V.). Another illustrative example include is Homo PP-INSPIRE 222, available from Braskem. In one aspect the polypropylene may have a high degree of crystallinity, i.e., the content of the crystalline phase exceeds 51% (as tested using differential scanning calorimetry) at 10° C./min cooling rate. In exemplary embodiments several different secondary polymers may be used and mixed together.

EXAMPLE 1

FORMULATION AND EXTRUSION

DAPLOY™ WB140 polypropylene homopolymer (available from Borealis A/S) was used as the polypropylene base resin. F020HC, available from Braskem, a polypropylene homopolymer resin, was used as the secondary resin. The two resins were blended with: Hydrocerol™ CF-40E™ as a primary nucleation agent, talc as a secondary nucleation agent, $CO_2$ as a blowing agent, a slip agent, and titanium dioxide as a colorant. Percentages were:
  79.9% Primary resin: high melt strength polypropylene Borealis WB140
  HMS15% Secondary resin: F020HC (Braskem)

0.1% Primary nucleating agent: Clariant Hyrocerol CF-40E™

2% Secondary nucleating agent: Talc

1% Colorant: $TiO_2$ PE (alternatively, PP can be used)

2% Slip agent: Ampacet™ 102823 LLDPE (linear low-density polyethylene), available from Ampacet Corporation The formulation was added to an extruder hopper. The extruder heated the formulation to form a molten resin mixture. To this mixture was added 1.1 lbs/hr $CO_2$ 0.7 lbs/hr R134a The carbon dioxide with R134a was injected into the resin blend to expand the resin and reduce density. The mixture thus formed was extruded through a die head into a sheet. The sheet was then cut and formed into a cup.

Figure 11:
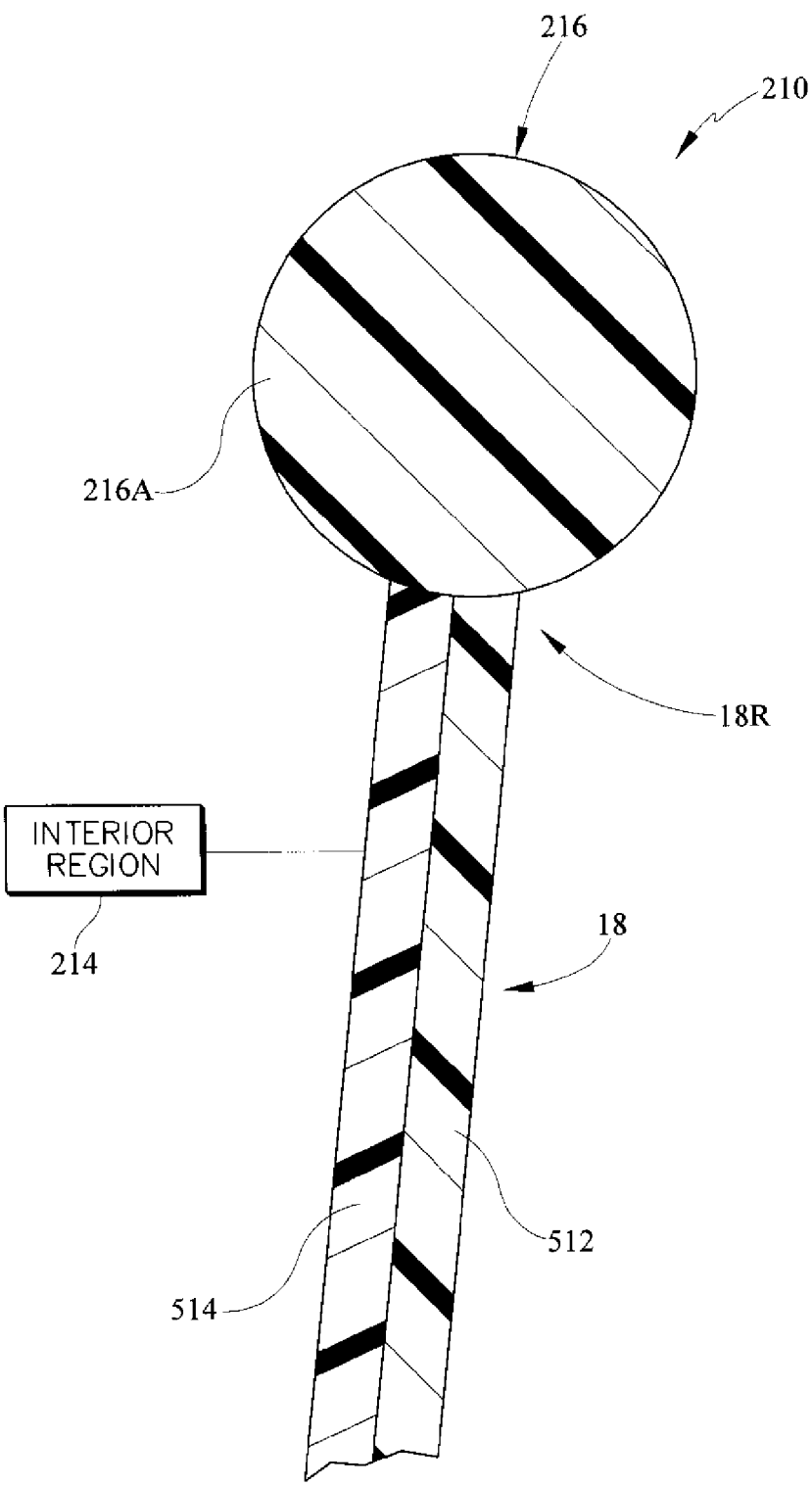
FIG. 11 is a partial dead section view of another embodiment of an insulative cup in accordance with the present disclosure showing that the insulative cup includes a sleeve-shaped side wall of a rim of a base and a molded brim coupled to a top surface of the sleeve-shaped side wall at about a six o'clock position on the molded brim.

Another embodiment of an insulative cup 210 in accordance with the present disclosure is shown in FIG. 11. Insulative cup 210 includes base 12 and molded brim 216 as suggested in FIG. 11. Molded brim 216 is coupled to side wall 18 included in base 12 about a six o'clock position on molded brim 216. As a result, a portion 216A of molded brim 16 extends into interior region 214 formed in base 12.

Figure 12:
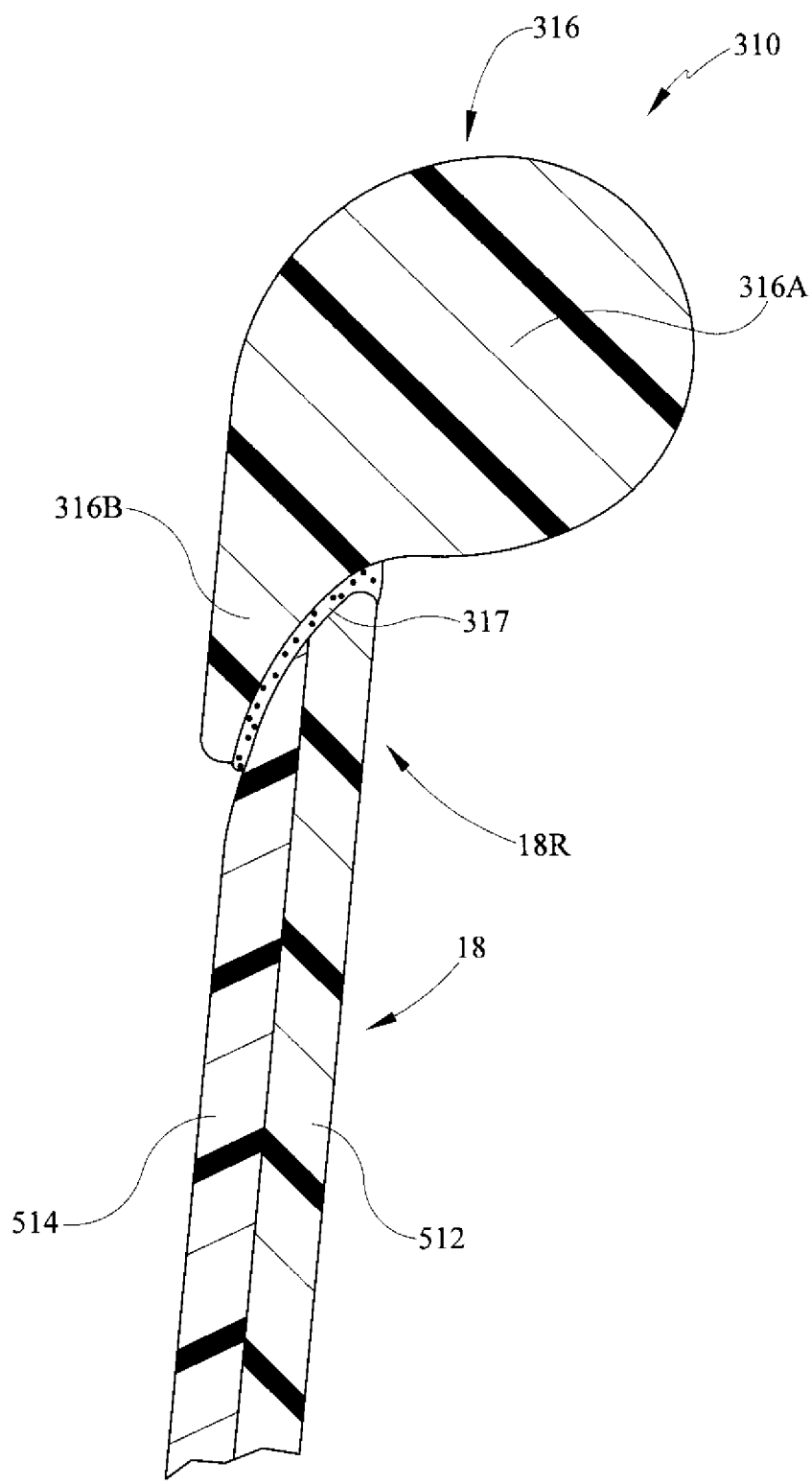
FIG. 12 is a partial dead section view of another embodiment of an insulative cup in accordance with the present disclosure showing that the insulative cup includes a sleeve-shaped side wall and a molded brim formed to have a teardrop-shaped cross-section and coupled to the sleeve-shaped side wall by an adhesive.

Insulative cup 310 in accordance with another embodiment of the present disclosure includes base 12, molded brim 316, and an adhesive 317 as shown in FIG. 12. Adhesive 317 is arranged to lie between and interconnect molded brim 316 and base 12.

Molded brim 316 includes, for example, a brim body 316A and a brim tail 316B as shown in FIG. 12. Brim tail 316B is arranged to interconnects brim body 316A and adhesive 317 to produce a relatively smooth transition T between molded brim 316 and side wall 18 of base 12. Brim tail 316B is appended to brim body 316A and is arranged to extend away from brim body 316A toward side wall 18 and interior region 14 as shown in FIG. 12.

Figure 13:
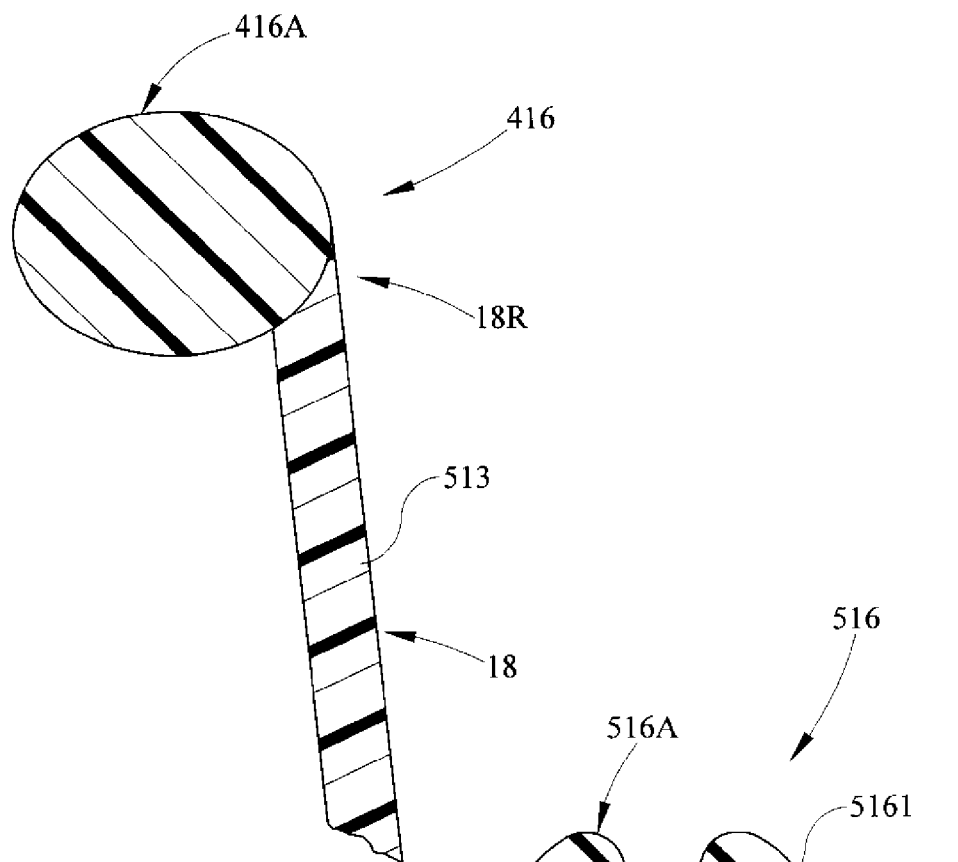
FIG. 13 is a partial dead section view of another embodiment of a molded brim in accordance with the present disclosure showing that the molded brim has an oval-shaped cross-section.

Another embodiment of a molded brim 416 in accordance with the present disclosure is shown in FIG. 13. Molded brim 416 has an oval-shaped cross-section 416A. In comparison, molded brim 16 has a circle-shaped cross-section 16A as shown in FIGS. 5 and 6.

Figure 14:
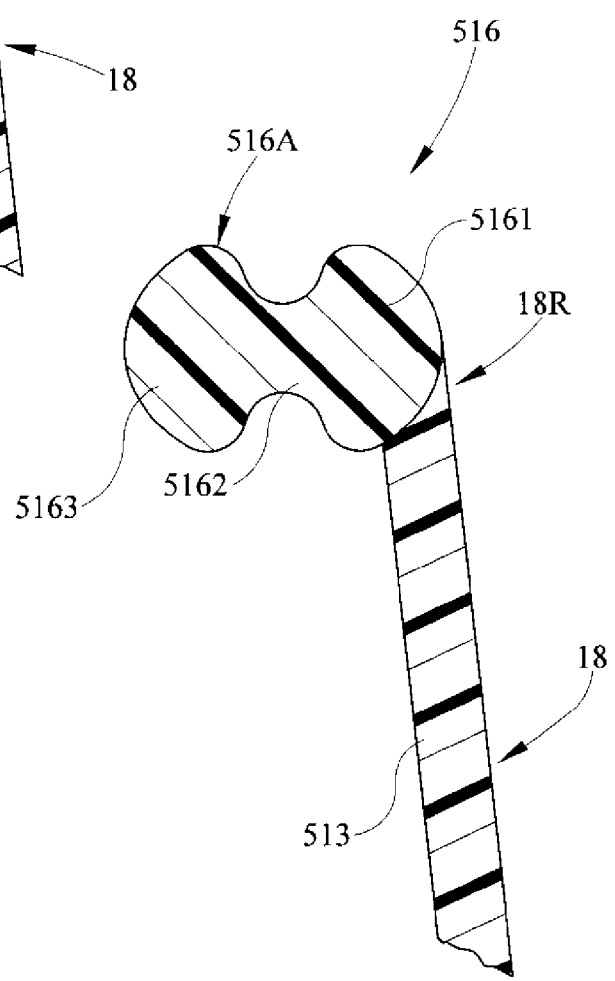
FIG. 14 is a partial dead section view of another embodiment of a molded brim in accordance with the present disclosure showing that the molded brim has a bowtie-shaped cross-section.
Figures 15, 15A:
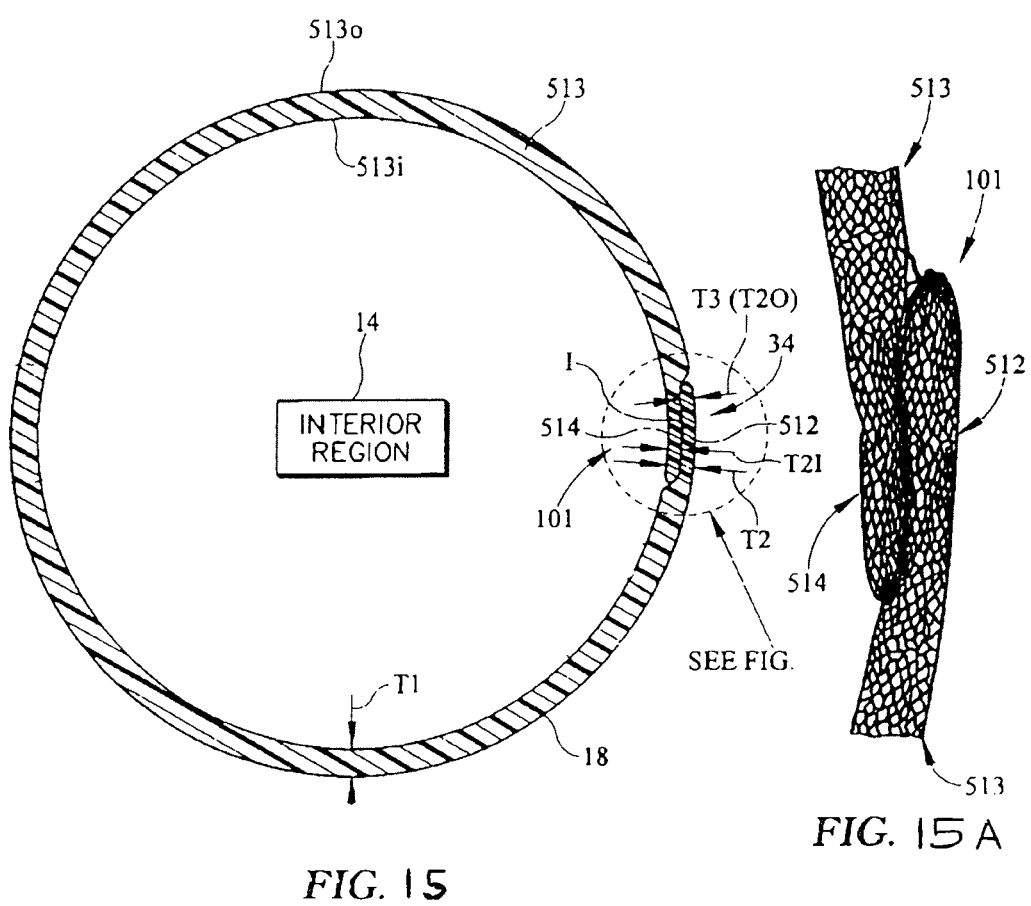
FIG. 15 is a section view taken between indicators T1 and T3 of FIG. 4 and showing that the side wall of the insulative cup includes a C-shaped fence, an upright outer tab coupled to one end of the C-shaped fence, and an upright inner tab coupled to an opposite end of the C-shaped fence and suggesting that the first and second tabs are arranged to overlap one another to establish a bridge extending between the ends of the C-shaped fence to define the interior region therebetween.
FIG. 15A is an enlarged dead section view of portion 101 of FIG. 15 of a bridge in accordance with the present disclosure showing how the insulative cellular non-aromatic polymer material has been compressed in both the first and second tabs to produce a bridge having a reduced thickness that is similar to a thickness of the side wall in the C-shaped fence opposite the bridge.

Still yet another embodiment of a molded brim 516 in accordance with the present disclosure is shown in FIG. 14. Molded brim 516 has a bow-tie shaped cross-section 516A as shown in FIG. 14. Molded brim 516 includes an inner lobe 5161, an outer lobe 5163, and a lobe strip 5162. Lobe strip 5162 is positioned to lie between and interconnect inner and outer lobes 5161, 5163 of molded brim 14. As shown in FIG. 14, inner lobe 5161 is coupled to upper portion of side wall 18 included in base 12. Outer lobe 5163 is spaced-apart radially from inner lobe 5161 and positioned to locate lobe strip 5162 therebetween.

The invention claimed is:

1. A drink cup comprising
a base including a bottom adapted to set on a generally flat surface and a sleeve-shaped side wall extending upwardly from the bottom, the base including an interior region bounded by the bottom and the sleeve-shaped side wall and terminating at a rim and
a brim mated to the rim of the base to lie in spaced-apart relation to the bottom and to frame an opening into the interior region formed in the base, wherein the sleeve-shaped side wall of the base comprises a first polypropylene polymeric material and the brim comprises a different second polypropylene polymeric material, and wherein the top surface of the rim of the base has a concave cross-section providing the top surface with a concave shape arranging outwardly away from the interior region of the base.

2. The drink cup of claim 1 wherein the brim includes a convex rim-engaging surface mating to and conforming with the top surface of the rim of the base and a convex exterior surface extending from an inner edge of the convex rim-engaging surface to an outer edge of the convex rim-engaging surface and interconnecting the interior and exterior surfaces of the rim of the base.

3. The drink cup of claim 2, wherein the convex rim-engaging surface and the convex exterior surface of the brim comprise a circular cross-sectional shape of the brim.

4. The drink cup of claim 1, wherein the sleeve-shaped side wall includes an upright inner tab extending upwardly from the bottom, an upright outer tab extending upwardly from the bottom and mating with the upright inner tab along an interface therebetween, and an upright fence interconnecting the upper inner and outer tabs, the upright inner tab forms a radially inner portion of the top surface of the rim of the side wall of the base, and the upright outer tab forms a radially outer portion of the top surface of the rim of the side wall of the base.

5. The drink cup of claim 4, wherein the upright fence forms another portion of the top surface of the rim of the side wall of the base.

6. The drink cup of claim 1, wherein the sleeve-shaped side wall of the base comprises an insulative cellular non-aromatic polymeric material and the brim comprises a non-cellular non-aromatic polymeric material.

7. The drink cup of claim 1, wherein the brim is an endless band having a circular cross-section.

8. The drink cup of claim 1, wherein the brim is an endless band having an oval-shaped cross-section.

9. The drink cup of claim 1, wherein the brim is an endless band having a bowtie-shaped cross-section.

10. A drink cup comprising
a base including a bottom adapted to set on a generally flat surface and a sleeve-shaped side wall extending upwardly from the bottom, the base including an interior region bounded by the bottom and the sleeve-shaped side wall and terminating at a rim and
a brim mated to the rim of the base to lie in spaced-apart relation to the bottom and to frame an opening into the interior region formed in the base, wherein the sleeve-shaped side wall of the base comprises a first polypropylene polymeric material and the brim comprises a different second polypropylene polymeric material, wherein the brim is an endless band and comprises a solid core and an endless tube-shaped outer surface surrounding the solid core and mating with the rim of the side wall of the base.

11. An insulative cup comprising
a base having an interior region and comprising an insulative cellular non-aromatic polymeric material and
a brim coupled to the base and including a mouth opening into the interior region and comprising a non-cellular non-aromatic polymeric material
wherein the brim is formed by compression molding, and wherein the brim is annular and comprises a non-cellular core and an endless tube-shaped outer surface surrounding the non-cellular core and mating with the base.

12. The vessel of claim 11, wherein the brim has a circular cross-section.

13. The vessel of claim 11, wherein the base includes a sleeve-shaped side wall coupled to the brim and the side wall comprises polypropylene insulative cellular polymeric material.

14. The vessel of claim 13, wherein the side wall is heated prior to securing the brim to the side wall.

15. The vessel of claim 13, wherein the brim is heated prior to securing the brim to the side wall.

16. The vessel of claim 13, wherein the brim is secured to the side wall by an adhesive.

17. The vessel of claim 13, wherein the brim is secured to the elongated wall by frictional welding.

* * * * *